(12) United States Patent
Ganguly et al.

(10) Patent No.: US 12,342,070 B2
(45) Date of Patent: Jun. 24, 2025

(54) LOW POWER MACHINE LEARNING USING REAL-TIME CAPTURED REGIONS OF INTEREST

(71) Applicant: GOOGLE LLC, Mountain View, CA (US)

(72) Inventors: Shamik Ganguly, San Jose, CA (US); Emily Barbara Cooper, San Francisco, CA (US); Gary Lee Vondran, Jr., San Carlos, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/819,170

(22) Filed: Aug. 11, 2022

(65) Prior Publication Data

US 2023/0049339 A1    Feb. 16, 2023

Related U.S. Application Data

(60) Provisional application No. 63/260,207, filed on Aug. 12, 2021, provisional application No. 63/260,206, filed on Aug. 12, 2021.

(51) Int. Cl.
*H04N 23/667* (2023.01)
*G06F 16/532* (2019.01)
(Continued)

(52) U.S. Cl.
CPC ......... *H04N 23/667* (2023.01); *G06F 16/532* (2019.01); *G06F 16/538* (2019.01);
(Continued)

(58) Field of Classification Search
CPC ...... G06F 16/532; G06F 16/538; G06F 1/163; G06F 1/1686; G06F 1/18; G06F 1/188;
(Continued)

(56) References Cited

U.S. PATENT DOCUMENTS

| 9,007,490 B1 | 4/2015 | Yuan et al. |
| 9,600,741 B1 | 3/2017 | Su et al. |

(Continued)

FOREIGN PATENT DOCUMENTS

| CN | 109117830 A | * | 1/2019 | ......... G06K 9/00228 |
| JP | 2006054519 A | | 2/2006 | |

(Continued)

OTHER PUBLICATIONS

International Search Report and Written Opinion for PCT Application No. PCT/US2022/074912, mailed on Nov. 25, 2022, 12 pages.

(Continued)

*Primary Examiner* — Antoinette T Spinks
(74) *Attorney, Agent, or Firm* — Brake Hughes Bellermann LLP

(57) ABSTRACT

Systems and methods are described for generating image content. The systems and methods may include, in response to receiving a request to cause a sensor of a computing device to identify image content associated with optical data captured by the sensor, detecting a first sensor data stream having a first image resolution, and detecting a second sensor data stream having a second image resolution. The systems and method may also include identifying, by processing circuitry of the computing device, at least one region of interest in the first sensor data stream, determining cropping coordinates that define a first plurality of pixels in the at least one region of interest in the first sensor data stream, and generating a cropped image representing the at least one region of interest.

20 Claims, 19 Drawing Sheets

(51) Int. Cl.
   *G06F 16/538* (2019.01)
   *G06V 10/25* (2022.01)
   *G06V 30/14* (2022.01)
   *G06V 30/148* (2022.01)
   *G06V 30/19* (2022.01)
   *H04N 7/18* (2006.01)
   *H04N 23/80* (2023.01)

(52) U.S. Cl.
   CPC .......... *G06V 10/25* (2022.01); *G06V 30/1444* (2022.01); *G06V 30/15* (2022.01); *G06V 30/191* (2022.01); *H04N 7/183* (2013.01); *H04N 23/80* (2023.01); *H04N 23/815* (2023.01)

(58) Field of Classification Search
   CPC ........ G06F 16/51; G06F 16/53; G06F 18/217; G06F 2203/011; G06F 3/005; G06F 3/011; G06F 3/012; G06F 3/017; G06F 3/0304; G06F 3/038; G06V 10/25; G06V 10/75; G06V 30/1444; G06V 30/15; G06V 30/191; G06V 10/776; G06V 20/20; G06V 20/30; G06V 20/41; G06V 20/64; G06V 20/647; G06V 2201/07; G06V 2201/09; G06V 40/16; G06V 40/172; G06V 40/20; H04N 23/60; H04N 23/667; H04N 23/80; H04N 23/815; H04N 7/183; H04N 1/2112; H04N 23/45; H04N 23/50; H04N 23/51; H04N 23/57; H04N 23/58; H04N 23/61; H04N 23/611; H04N 23/62; H04N 23/661; H04N 23/6812; H04N 23/73; H04N 5/44; H04N 7/185; G01S 3/7864; G02B 2027/0138; G02B 2027/014; G02B 2027/0178; G02B 2027/0187; G02B 27/0093; G02B 27/017; G06Q 30/0246; G06Q 30/0257; G06Q 30/0267; G06Q 30/0269; G06T 2207/10004; G06T 2207/10016; G06T 2207/30232; G06T 7/20; G06T 7/71; G06T 7/97

See application file for complete search history.

(56) References Cited

U.S. PATENT DOCUMENTS

| | | |
   |---|---|---|
   | 10,402,790 B1 | 9/2019 | Clark et al. |
   | 2010/0289904 A1 | 11/2010 | Zhang et al. |
   | 2012/0134590 A1 | 5/2012 | Petrou et al. |
   | 2013/0129152 A1 | 5/2013 | Rodriguez et al. |
   | 2014/0253701 A1 | 9/2014 | Wexler et al. |
   | 2015/0042562 A1 | 2/2015 | Kurzweil et al. |
   | 2016/0026870 A1 | 1/2016 | Wexler et al. |
   | 2020/0125882 A1 | 4/2020 | Pribble et al. |
   | 2020/0195875 A1* | 6/2020 | Berkovich .............. G06V 10/25 |
   | 2021/0027590 A1* | 1/2021 | Lin ........................... G06T 7/11 |
   | 2021/0034856 A1 | 2/2021 | Torres et al. |
   | 2022/0027111 A1 | 1/2022 | Lu et al. |
   | 2024/0346783 A1* | 10/2024 | Lowry ................... H04N 5/272 |

FOREIGN PATENT DOCUMENTS

| | | |
   |---|---|---|
   | JP | 2006277315 A | 10/2006 |
   | JP | 2007156741 A | 6/2007 |
   | JP | 2009077066 A | 4/2009 |
   | JP | 201008110 A | 4/2010 |
   | JP | 2015102915 A | 6/2015 |
   | JP | 2015537325 A | 12/2015 |
   | JP | 2019046007 A | 3/2019 |
   | WO | 2017109998 A1 | 6/2017 |
   | WO | 2018123360 A1 | 7/2018 |

OTHER PUBLICATIONS

International Search Report and Written Opinion for PCT Application No. PCT/US2022/074915, mailed on Nov. 23, 2022, 11 pages.
   Office Action for Japanese Application No. 2024-508515 (with English translation), mailed Apr. 1, 2025, 14 pages.

* cited by examiner

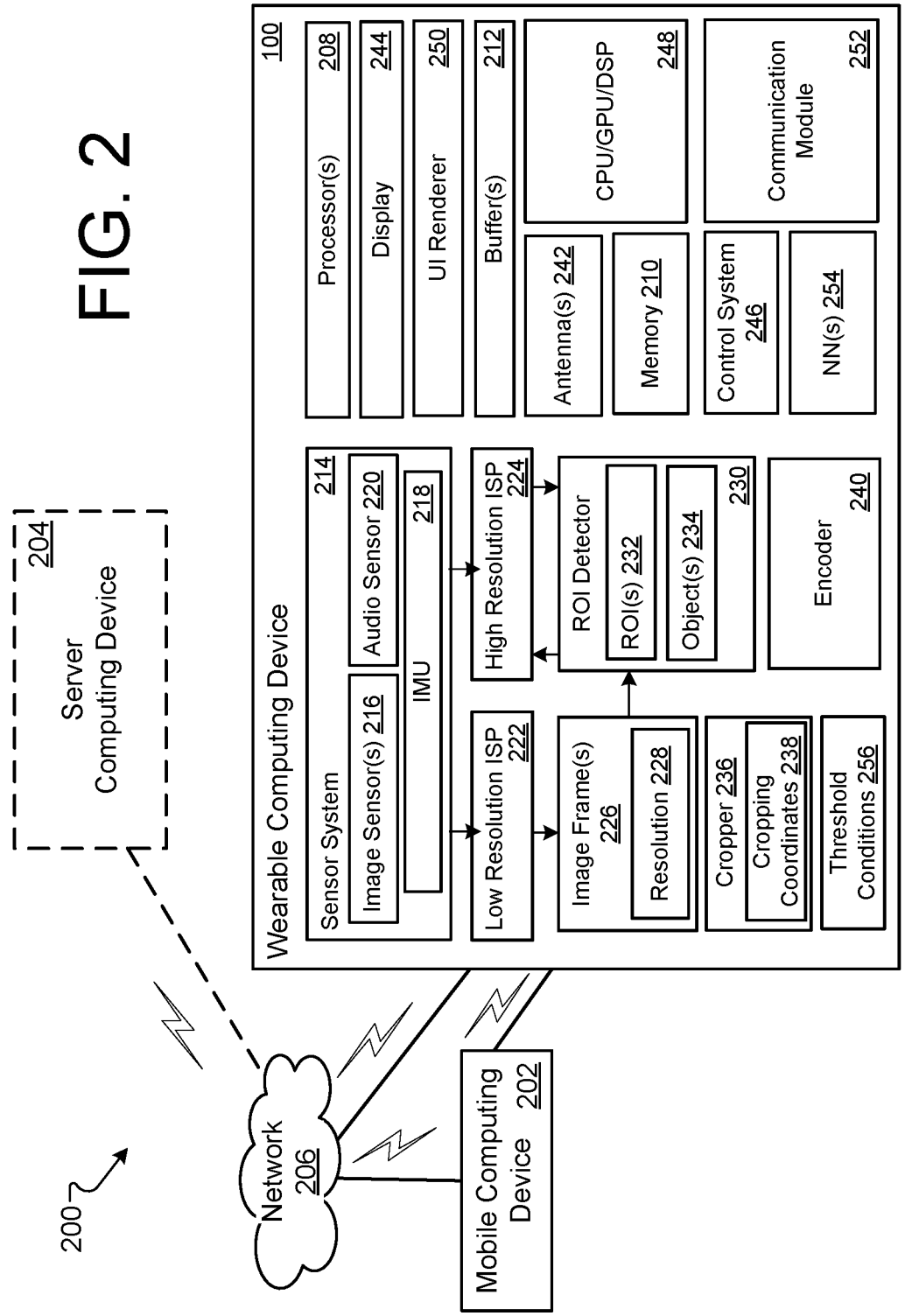

LOW POWER MACHINE LEARNING USING REAL-TIME CAPTURED REGIONS OF INTEREST

CROSS REFERENCE TO RELATED APPLICATIONS

This Application claims priority to and the benefit of U.S. Provisional Application No. 63/260,206, and U.S. Provisional Application No. 63/260,207, filed on Aug. 12, 2021, the disclosures of which are incorporated herein by reference in their entireties.

TECHNICAL FIELD

This description generally relates to methods, devices, and algorithms used to process image content.

BACKGROUND

Computer vision techniques enable computers to analyze and extract information from images. Such computer vision techniques may be costly with respect to processing and power consumption. As the demand to balance performance and power consumption on mobile computing devices continues to grow, device manufacturers are tasked with configuring devices to balance image degradation with device performance to avoid overtaxing the limits of mobile computing devices.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, an image processing method is described. The method may include, in response to receiving a request to cause a sensor of a wearable or non-wearable computing device to identify image content associated with optical data captured by the sensor, detecting a first sensor data stream having a first image resolution, the first sensor data stream based on the optical data, and detecting a second sensor data stream having a second image resolution, the second sensor data stream being based on the optical data.

The method may further include identifying, by processing circuitry of the wearable or non-wearable computing device, at least one region of interest in the first sensor data stream, determining, by the processing circuitry, cropping coordinates that define a first plurality of pixels in the at least one region of interest in the first sensor data stream, and generating, by the processing circuitry, a cropped image representing the at least one region of interest. The generating may include identifying a second plurality of pixels in the second sensor data stream using the cropping coordinates that define the first plurality of pixels in the at least one region of interest in the first sensor data stream, and cropping the second sensor data stream to the second plurality of pixels.

Implementations may include any of the following features alone or in combination. The method may also include performing, by the processing circuitry, optical character resolution on the cropped image to generate a machine-readable version of the cropped image, performing, by the processing circuitry, a search query using the machine-readable version of the cropped image to generate a plurality of search results, and causing display of search results on a display of the wearable or non-wearable computing device.

In some implementations, the second sensor data stream is stored in memory on the wearable or non-wearable computing device and the method may further include, in response to identifying the at least one region of interest in the first sensor data stream, retrieving a corresponding at least one region of interest in the second sensor data stored in memory and restricting access to the first sensor data stream while continuing to detect and access the second sensor data stream.

In some implementations, the method may further include causing transmission of the generated cropped image to a mobile device in communication with the wearable or non-wearable computing device in response to generating the cropped image representing the at least one region of interest, receiving, from the mobile device, information about the at least one region of interest, and causing display of the information on a display of the wearable or non-wearable computing device.

In some implementations, the computing device is a battery powered computing device and the first image resolution has low image resolution and the second image resolution has high image resolution. In some implementations, identifying the at least one region of interest further includes identifying, by a machine-learning algorithm executing on the wearable or non-wearable computing device and using the first sensor data as input, text or at least one object represented in the first sensor data.

In some implementations, the processing circuitry includes at least a first image processor configured to perform image signal processing on the first sensor data stream and a second image processor configured to perform image signal processing on the second sensor data stream, the first image resolution of the first sensor data stream being lower than the second image resolution of the second data sensor stream.

In some implementations, generating the cropped image representing the at least one region of interest is performed in response to detecting that the at least one region of interest meets a threshold condition, the threshold condition including detecting that the second plurality of pixels in the second sensor data stream have low blur.

In a second general aspect, a wearable computing device is described. The wearable computing device includes at least one processing device, at least one image sensor configured to capture optical data, and a memory storing instructions that when executed cause the wearable computing device to perform operations including in response to receiving a request to cause the at least one image sensor to identify image content associated with the optical data, detecting a first sensor data stream having a first image resolution, the first sensor data stream based on the optical data, and detecting a second sensor data stream having a second image resolution, the second sensor data stream being based on the optical data.

The operations may further include identifying at least one region of interest in the first sensor data stream; determining cropping coordinates that define a first plurality of pixels in the at least one region of interest in the first sensor data stream, and generating a cropped image representing the at least one region of interest where the generating includes identifying a second plurality of pixels in the second sensor data stream using the cropping coordinates that define the first plurality of pixels in the at least one region of interest in the first sensor data stream, and cropping the second sensor data stream to the second plurality of pixels.

Implementations may include any of the following features alone or in combination. In some implementations, the at least one image sensor is a dual stream image sensor configured to operate in a low image resolution mode until triggered to switch to operating in a high image resolution mode. In some implementations, the operations further include performing optical character resolution on the cropped image to generate a machine-readable version of the cropped image, performing a search query using the machine-readable version of the cropped image to generate a plurality of search results, and causing display of search results on a display of the wearable computing device. In some implementations, the wearable computing device may cause an audio output of the performed optical character resolution from a speaker of the wearable computing device.

In some implementations, the second sensor data stream is stored in memory on the wearable computing device and the operations further include, in response to identifying the at least one region of interest in the first sensor data stream, retrieving a corresponding at least one region of interest in the second sensor data stored in memory and restricting access to the first sensor data stream while continuing to detect and access the second sensor data stream.

In some implementations, the operations further include causing transmission of the generated cropped image to a mobile device in communication with the wearable computing device in response to generating the cropped image representing the at least one region of interest, receiving, from the mobile device, information about the at least one region of interest, and causing display of the information on a display of the wearable computing device. In some implementations, the operations include causing output (e.g., audio, visual, tactile, etc.) of the information at the wearable computing device.

In some implementations, the first image resolution has low image resolution and the second image resolution has high image resolution and the operations may further include identifying the at least one region of interest further includes identifying, by a machine-learning algorithm executing on the wearable computing device and using the first sensor data as input, text or at least one object represented in the first sensor data.

In some implementations, the at least one processing device includes a first image processor configured to perform image signal processing on the first sensor data stream and a second image processor configured to perform image signal processing on the second sensor data stream, the first image resolution of the first sensor data stream being lower than the second image resolution of the second data sensor stream.

Implementations of the described techniques may include hardware, a method or process, or computer software on a computer-accessible medium. The details of one or more implementations are set forth in the accompanying drawings and the description below. Other features will be apparent from the description and drawings, and from the claims.

BRIEF DESCRIPTION OF THE DRAWINGS

FIG. 2 illustrates a system for performing image processing on a wearable computing device, according to implementations described throughout this disclosure.

Like reference symbols in the various drawings indicate like elements.

DETAILED DESCRIPTION

Figure 1:
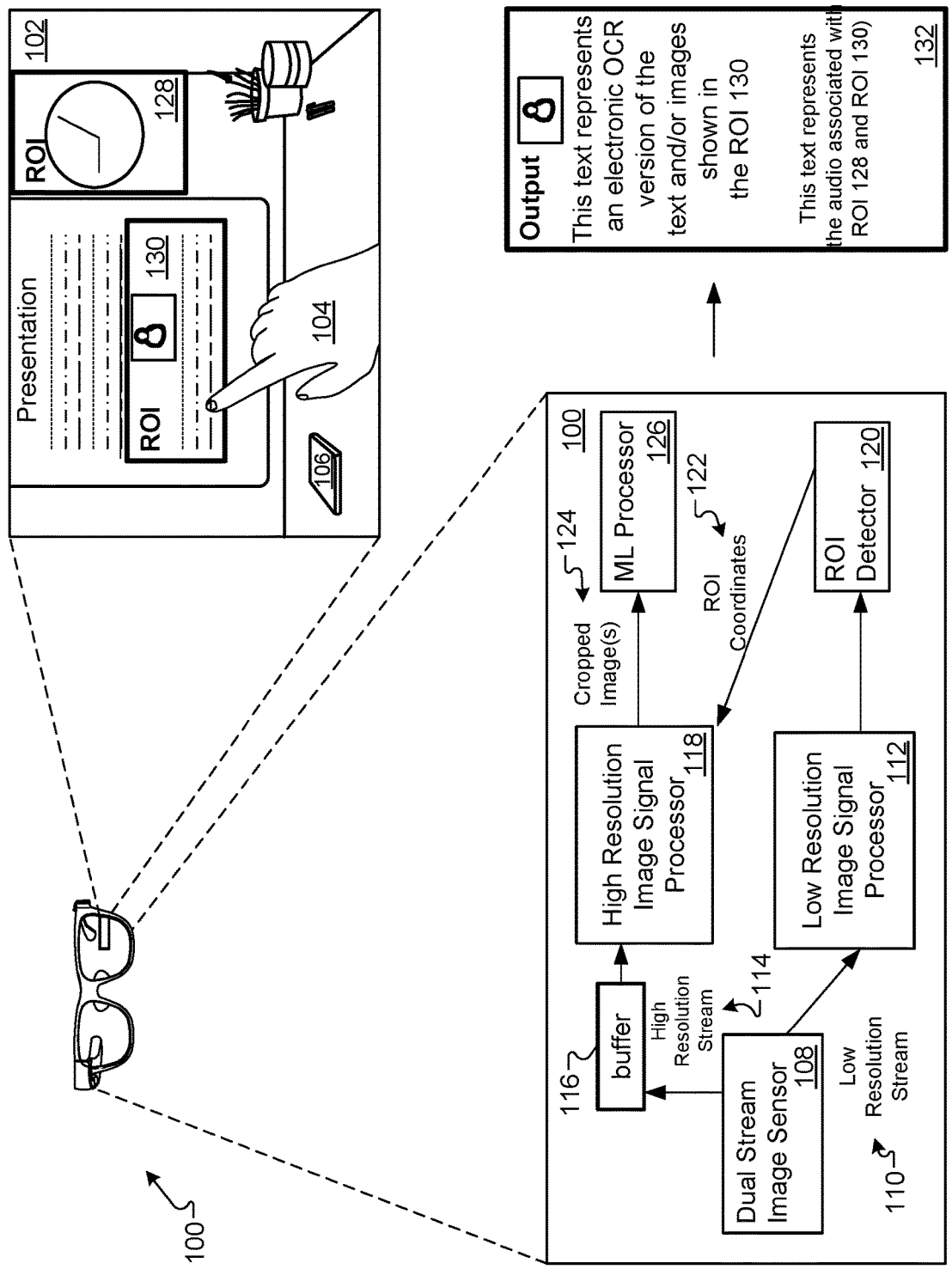
FIG. 1 is an example of a wearable computing device for generating and processing image content using limited computational and/or power resources, according to implementations described throughout this disclosure.

This disclosure describes systems and methods for performing image processing that may enable wearable computing devices to efficiently carry out computer vision tasks. For example, the systems and methods described herein may utilize processors, sensors, neural networks, and/or image analysis algorithms to recognize text, symbols, and/or objects in images and/or extract information from the images. In some implementations, the systems and methods described herein can perform such tasks while operating in a reduced computational mode and/or reduced electrical power mode. For example, the systems and methods described herein can minimize an amount of image data used when performing computer vision and image analysis tasks to reduce the use of particular hardware and/or device resources (e.g., memory, processors, network bandwidth, etc.).

Configuring wearable computing devices for a reduced use of resources can provide the advantage of allowing such devices to carry out relatively low-power computational tasks onboard the device without sending tasks to other devices (e.g., servers, mobile devices, other computers, etc.). For example, instead of analyzing an entire image, the systems and methods described herein may identify regions of interest (ROIs) in image data and one or more of those regions may be analyzed onboard a wearable computing device. Reducing the amount of information to analyze while still maintaining accurate results may allow complex image processing tasks to be performed on the wearable computing device without the resource burden of analyzing the entire image.

In some implementations, the systems and methods described herein may be configured to be executed on a device to ensure such a device may perform efficient image processing tasks while reducing computational load and/or electrical power. For example, the systems and methods described herein may enable a wearable device to perform object detection tasks, optical character recognition (OCR) tasks, and/or other image processing tasks while utilizing particular techniques to reduce power, memory, and/or processing consumption.

In some implementations, the systems and methods described herein may ensure that complex image processing computations may be executed on a wearable device without assistance from other resources and/or devices. For example, conventional systems may request assistance from other communicably coupled mobile devices, servers, and/or off-board systems to carry out computational heavy image processing tasks. The systems and methods described herein provide an advantage of generating portions of images (e.g., ROIs, objects, cropped image content, etc.) that may be operated upon by a device with less computational ability than a server, for example, while still providing full and accurate image processing abilities.

The systems and methods described herein may enable a wearable computing device to use machine-learning intelligence (e.g., neural networks, algorithms, etc.) that utilize low power consumption and/or low processing consumption to carry out computer vision tasks such as object detection, movement tracking, facial recognition, OCR tasks, and the like.

In some implementations, the systems and methods described herein may employ scalable levels of image processing to utilize fewer processing and/or power resources. For example, a low resolution image signal processor may be used to carry out low-level image processing tasks on a low resolution image stream while a high resolution image signal processor may be used to carry out high-level image processing tasks on a high resolution image stream. In some implementations, output from the low resolution image signal processor can be provided as input to additional sensors, detectors, machine learning networks, and/or processors. Such output may represent a portion of an image (e.g., pixels, regions of interest, recognized image content, etc.) which may be used to identify content in a higher resolution image that includes image content representing corresponding pixels, regions of interest, and/or recognized image content from the low resolution image.

In some implementations, the systems and methods described herein may utilize one or more sensors onboard a wearable computing device to split detection and/or processing tasks. For example, a wearable computing device may include a dual stream sensor (e.g., camera) that may retrieve both a high resolution image stream and a low resolution image stream from a plurality of images. For example, the low resolution image stream may be captured by the sensor functioning as a scene camera. The high resolution image stream may be captured by the same sensor functioning as a detail camera. One or both streams may be provided to different processors to carry out image processing tasks. In some implementations, each stream may be used to generate different information for use in carrying out computer vision tasks, machine learning tasks, and/or other image processing tasks.

FIG. 1 is an example of a wearable computing device 100 for generating and processing image content using limited computational and/or power resources, according to implementations described throughout this disclosure. In this example, the wearable computing device 100 is depicted in the form of AR smart glasses. However, any form factor of a battery-powered device may be substituted and combined with the systems and methods described herein. In some implementations, the wearable computing device 100 includes a system on chip (SOC) architecture (not shown) in combination with any or all of one or more sensors, low power island processors, high power island processors, core processors, encoders, and the like.

In operation, the wearable computing device 100 may capture a scene 102 by means of a camera, image sensor, or the like. The wearable computing device 100 may be worn and operated by a user 104. The scene 102 may include physical content as well as augmented reality (AR) content. In some implementations, the wearable computing device 100 may be communicably coupled with other devices, such as mobile computing device 106.

In operation, the mobile computing device 106 may include a dual stream image sensor 108 (e.g., a dual resolution image sensor). The dual stream image sensor 108 may provide a low-resolution image stream 110 to a low resolution (e.g., lightweight) image signal processor 112. The dual stream image sensor 108 may simultaneously provide a high-resolution image stream 114 to a buffer 116. A high resolution image signal processor 118 may obtain high-resolution image stream 114 from the buffer 116 to perform additional processing. The low-resolution image stream 110 may be provided to a ML model that identifies one or more ROIs (e.g., text, objects, hand, paragraphs, etc.) via an ROI detector 120, for example. The processor 112 may determine ROI coordinates 122 (e.g., cropping coordinates) associated with the one or more ROIs.

The high resolution image signal processor 112 may receive (or request) the ROI coordinates 122 and may use the ROI coordinates 122 to crop one or more high resolution image from high-resolution image stream 114. For example, the processor 112 may retrieve the ROI coordinates 122 associated with the low-resolution image stream 110 in order to determine within the high-resolution image stream 114, which frames and regions match a same capture time as the low resolution image frame associated in which the ROI was identified. The high resolution image signal processor 118 may then crop the image to the same cropping ROI coordinates 122. The cropped image 124 may be provided to an ML engine (e.g., ML processor 126, for example, to perform computer vision tasks including, but not limited to, OCR, object recognition, deep paragraphing, hand detection, face detection, symbol detection, and the like.

In a non-limiting example, the wearable computing device 100 may be triggered to begin real time image processing in response to a request to identify image content associated with optical data captured by the dual stream image sensor 108. The request may be from a user wearing the wearable computing device 100. The real time image processing may begin with detecting a first sensor data stream (e.g., the low-resolution image stream 110) and a second sensor data stream (e.g., high-resolution image stream 114). The wearable computing device 100 may then identify at least one region of interest (e.g., ROI 128 and ROI 130). In this example, ROI 128 includes an analog clock and ROI 130 includes text and images of a presentation. The device 100 may analyze the first stream (e.g., the low-resolution image stream 110) to determine cropping coordinates for the ROIs 128 and 130.

The wearable computing device 100 may obtain high-resolution image stream 114 from buffer 116 to identify the same corresponding (e.g., same capture time, same cropping coordinates within the frames) ROIs 128 and 130 within the high-resolution image stream 114 in order to crop one or more image frames of the high-resolution image stream 114 corresponding to the ROIs 128 and 130 from the low-resolution image stream 110. The cropped one or more image frames may be provided to an onboard ML processor 126 to carry out additional processing of the cropped image. Cropping the image to provide less image content (e.g., less visual sensor data, portions of images, etc.) for imaging analysis may result in ML processing being carried out using less power and latency than conventional ML processors that are requested to analyze an entire image. Thus, the wearable computing device 100 may perform ML processing in real time for tasks such as OCR, object recognition, deep paragraphing, hand detection, face detection, symbol detection, and the like.

For example, the wearable computing device 100 may identify ROI 130, perform the image cropping, and use ML processing to determine that the hand of the user 104 is pointing to an image and text of ROI 130. The processing may perform hand detection and OCR on the ROI 130. Similarly, if audio content is available during the presentation, the wearable computing device 100 may assess the ROI 128 for a timestamp of when the user 104 pointed to ROI 130. The timestamp (e.g., 9:05) may be used to retrieve and analyze audio data (e.g., a transcript) associated with ROI 130. Such audio data may be converted into visual text for presentation on a display of wearable computing device 100. Thus, the ML processor 126 may select ROIs, but may also correlate the ROIs, as shown by output 132. The output 132 may be presented on a display of wearable computing device 100.

Although multiple processor blocks (e.g., processor 112, processor 118, processor 126, etc.) are depicted, a single processor may be utilized to carry out all processing tasks on wearable computing device 100. That is, each processor block 112, 118, and 126 may represent a different algorithm or code snippet that may be executed on a single processor onboard the wearable computing device 100.

In some implementations, objects and/or ROIs may be cropped at the dual stream image sensor 108, rather than being cropped by the processor 112 or 118. In some implementations, as described in detail above, the objects and/or ROIs may be cropped at either image signal processors 112 or image signal processor 118. In some implementations, the ROI may instead be prepared and sent to a mobile device in communication with wearable computing device 100. The mobile device may crop the ROI and provide the cropped image back to the wearable computing device 100.

FIG. 2 illustrates a system 200 for performing image processing on a wearable computing device 100, according to implementations described throughout this disclosure. In some implementations, the image processing is performed on the wearable computing device 100. In some implementations, the image processing is shared amongst one or more devices. For example, the image processing may be partially completed on the wearable computing device 100, and partially completed on a mobile computing device 202 (e.g., such as mobile computing device 106) and/or server computing device 204. In some implementations, image processing is performed on the wearable computing device 100 and output from such processing is provided to the mobile computing device 202 and/or the server computing device 204.

In some implementations, the wearable computing device 100 includes one or more computing devices, where at least one of the devices is a display device capable of being worn on or in proximity to the skin of a person. In some examples, the wearable computing device 100 is or includes one or more wearable computing device components. In some implementations, the wearable computing device 100 may include a head-mounted display (HMD) device such as an optical head-mounted display (OHMD) device, a transparent heads-up display (HUD) device, a virtual reality (VR) device, an AR device, or other devices such as goggles or headsets having sensors, display, and computing capabilities. In some implementations, the wearable computing device 100 includes AR glasses (e.g., smart glasses). AR glasses represent an optical head-mounted display device designed in the shape of a pair of eyeglasses. In some implementations, the wearable computing device 100 is or includes a smart watch. In some implementations, the wearable computing device 100 is or includes a piece of jewelry. In some implementations, the wearable computing device 100 is or includes a ring controller device or other wearable controller. In some implementations, the wearable computing device 100 is or includes earbuds/headphones or smart earbuds/headphones.

As shown in FIG. 2, the system 200 includes the wearable computing device 100 communicably coupled to a mobile computing device 202 and optionally a server computing device 204. In some implementations, the communicable coupling may occur via a network 206. In some implementations, the communicable coupling may occur directly between wearable computing device 100, mobile computing device 202, and/or server computing device 204.

The wearable computing device 100 includes one or more processors 208, which may be formed in a substrate configured to execute one or more machine executable instructions or pieces of software, firmware, or a combination thereof. The processors 208 can be semiconductor-based and may include semiconductor material that can perform digital logic. The processor 208 may include CPUs, GPUs, and/or DSPs, just to name a few examples.

The wearable computing device 100 can also include one or more memory devices 210. The memory devices 210 may include any type of storage device that stores information in a format that can be read and/or executed by the processor(s) 208. The memory devices 210 may store applications and modules that, when executed by the processor(s) 208, perform certain operations. In some examples, the applications and modules may be stored in an external storage device and loaded into the memory devices 210. The memory 210 may include or have access to buffers 212, for example, to store and retrieve image content and/or audio content for the wearable computing device 100.

The wearable computing device 100 includes a sensor system 214. The sensor system 214 includes one or more image sensors 216 configured to detect and/or obtain image data. In some implementations, the sensor system 214 includes multiple image sensors 216. As shown, the sensor system 214 includes one or more image sensors 216. The image sensor 216 may capture and record images (e.g., pixels, frames, and/or portions of images) and video.

In some implementations, the image sensor 216 is a red green blue (RGB) camera. In some examples, the image sensor 216 includes a pulsed laser sensor (e.g., a LiDAR sensor) and/or depth camera. For example, the image sensor 216 may be a camera configured to detect and convey information used to make an image, which is represented by the image frames 226. The image sensor 216 can capture and record both images and video.

In operation, the image sensor 216 is configured to obtain (e.g., capture) image data (e.g., optical sensor data) continuously or periodically while the wearable computing device 100 is activated. In some implementations, the image sensor 216 is configured to operate as an always-on sensor. In some implementations, the imaging sensor 216 may be activated in response to the detection of an object or region of interest.

In some implementations, the image sensor 216 is a single sensor configured to function in a dual resolution streaming mode. For example, the image sensor 216 may operate in a low resolution streaming mode that captures (e.g., receives, obtains, etc.) a plurality of images that have a low image resolution. The sensor 216 may simultaneously operate in a high resolution streaming mode that captures (e.g., receives, obtains, etc.) the same plurality of images with high image resolution. The dual mode may capture or retrieve the plurality of images as a first image stream with low image resolution and a second image stream with high image resolution.

In some implementations, the wearable computing device 100 may employ the image sensor 216 to use scalable levels of image processing to utilize fewer processing and/or power resources. For example, the systems and methods described herein may employ low level image processing, mid-level image processing, high-level image processing, and/or any combination in between the levels and/or any combination of the levels by using two or more different types of image signal processors. In some implementations, the systems and methods described herein may also vary resolution of images when performing image processing techniques.

As used herein, high-level processing includes image processing on high resolution image content. For example, computer vision techniques for performing content (e.g., object) recognition may be considered high-level processing. Mid-level image processing includes processing tasks that extract scene descriptions from image metadata, for example which may indicate positions and/or shapes of portions of a scene. Low-level image processing includes extracting descriptions from images while ignoring scene objects and observer details.

The sensor system 214 may also include an inertial motion unit (IMU) sensor 218. The IMU sensor 218 may detect motion, movement, and/or acceleration of the wearable computing device 100. The IMU sensor 218 may include various different types of sensors such as, for example, an accelerometer, a gyroscope, a magnetometer, and other such sensors.

In some implementations, the sensor system 214 may also include an audio sensor 220 configured to detect audio received by wearable computing device 100. The sensor system 214 may include other types of sensors such as a light sensor, a distance and/or proximity sensor, a contact sensor such as a capacitive sensor, a timer, and/or other sensors and/or different combination(s) of sensors. The sensor system 214 may be used to obtain information associated with a position and/or orientation of wearable computing device 100.

The wearable computing device 100 may also include a low resolution image signal processor 222 to process images from the low-resolution image stream (e.g., low-resolution image stream 110). The low resolution image signal processor 222 may also be referred to as a low power image signal processor. The wearable computing device 100 may also include a high-resolution image signal processor 224 to process images from the high resolution image stream (e.g., high-resolution image stream 114). The high resolution image signal processor 224 may also be referred to as a high power image signal processor (with respect to the low resolution image signal processor 222). The image streams may include image frames 226, each with a particular image resolution 228. In operation, the image sensor 216 may be dual function to operate in either or both of a low power, low resolution (LPLR) mode and/or a high power, high resolution (HPLR) mode.

The wearable computing device 100 may include a region of interest (ROI) detector 230 configured to detect ROIs 232 and/or objects 234. In addition, the wearable computing device 100 may include a cropper 236 configured to crop image content (e.g., image frames 226) and ROIs 232 according to cropping coordinates 238. In some implementations, the wearable computing device 100 includes an encoder 240 configured to compress particular pixel blocks, image content, etc. The encoder 240 may receive image content for compression from a buffer 212, for example.

The low resolution image signal processor 222 may perform low power computations to analyze the generated stream of images from the sensor 216 to detect an object and/or region of interest within image(s). The detection may include hand detection, object detection, paragraph, detection, and the like. When an object of interest and/or ROI is detected and the detection of such a region or object meets a threshold condition 256, a bounding box and/or other coordinates pertaining to the object and/or region may be identified. The threshold condition may represent a particular high level of quality for an object or region in an image frame of the stream of images. For example, a threshold condition may pertain to any or all of determining that the object or region is in focus, still with low blur (e.g., low motion blur), and/or has the correct exposure and/or has a specific object detected in a view of the computing device.

The wearable computing device 100 may also include one or more antennas 242 configured to communicate with other computing devices via wireless signals. For example, the wearable computing device 100 may receive one or more wireless signals and use the wireless signals to communicate with other devices such as mobile computing device 202 and/or server computing device 204, or other devices within range of antennas 242. The wireless signals may be triggered via a wireless connection such as a short-range connection (e.g., Bluetooth connection or near-field communication (NFC) connection) or an Internet connection (e.g., Wi-Fi or mobile network).

The wearable computing device 100 includes a display 244. The display 244 may include a liquid crystal display (LCD), a light-emitting diode (LED) display, an organic light-emitting display (OLED), an electro-phoretic display (EPD), or a micro-projection display adopting an LED light source. In some examples, the display 244 is projected onto the field of view of the user. In some examples, in the case of AR glasses, the display 244 may provide a transparent or semi-transparent display such that a user wearing the AR glasses can view images provided by the display 244 but also information located in the field of view of the AR glasses behind the projected images.

The wearable computing device 100 also includes a control system 246 including various control system devices to facilitate operation of the wearable computing device 100. The control system 246 may utilize processor 208, sensor system 214, and/or processor 248 (e.g., CPUs, GPUS, DSPs, and the like) operably coupled to the components of the wearable computing device 100.

The wearable computing device 100 also includes a UI renderer 250. The UI renderer 250 may function with the display 244 to depict user interface objects or other content to the user of the wearable computing device 100. For example, the UI renderer 250 may receive images captured by the wearable computing device 100 to generate and render additional user interface content on the display 244.

The wearable computing device 100 also includes a communication module 252. The communication module 252 may enable the wearable computing device 100 to communicate to exchange information with another computing device within range of the wearable computing device 100. For example, the wearable computing device 100 may be operably coupled to another computing device, to facilitate communication via, for example, a wired connection, a wireless connection via for example, Wi-Fi or Bluetooth, or other type of connection.

In some implementations, the wearable computing device 100 is configured to communicate with the server computing device 204 and/or the mobile computing device 202 over the network 206. The server computing device 204 may represent one or more computing devices that take the form of a number of different devices, for example a standard server, a group of such servers, or a rack server system. In some implementations, the server computing device 204 is a single system sharing components such as processors and memories. The network 206 may include the Internet and/or other types of data networks, such as a local area network (LAN), a wide area network (WAN), a cellular network, satellite network, or other types of data networks. The network 206 may also include any number of computing devices (e.g., computer, servers, routers, network switches, etc.) that are configured to receive and/or transmit data within network 206.

In some implementations, the wearable computing device 100 also includes neural networks NNs 254 to carry out machine learning tasks onboard the wearable computing device 100. The neural networks may be used with machine learning models and/or operations to generate, correct, predict, and/or detect particular image content. In some implementations, the image processing that is performed on the sensor data obtained by the sensor(s) 216 are referred to as machine learning (ML) inference operations. An inference operation may refer to an image processing operation, step, or sub-step that involves a ML model that makes (or leads to) one or more predictions. Certain types of image processing carried out by wearable computing device 100 may use ML models to make predictions. For example, machine learning may use statistical algorithms that learn data from existing data, in order to render a decision about new data, which is a process called inference. In other words, inference refers to the process of taking a model that is already trained and using that trained model to make predictions. Some examples of inference may include image recognition (e.g., OCR text recognition, facial recognition, facial, body, or object tracking, etc.), and/or perception (e.g., always-on audio sensing, voice-input request audio sensing, etc.).

In some implementations, a ML model includes one or more NNs 254. NNs 254 transform an input, received by an input layer, through a series of hidden layers, and produce an output via an output layer. Each layer is made up of a subset of the set of nodes. The nodes in hidden layers are fully connected to all nodes in the previous layer and provide respective output(s) to all nodes in the next layer. The nodes in a single layer function independently of each other (i.e., do not share connections). Nodes in the output provide the transformed input to a requesting process. In some implementations, the NNs 254 utilized by wearable computing device 100 is a convolutional neural network, which is a NN that is not fully connected.

In general, wearable computing device 100 may employ NNs and classifiers (not shown) to generate train data and to perform ML tasks. For example, the processor 208 may be configured to execute a classifier that detects whether or not an ROI 232, for example, is included within the image frame 226 captured by the image sensor 216. The ROI 232 can also be referred to as an object of interest. The classifier may include or be defined by a ML model. The ML model may define a number of parameters used by the ML model to make a prediction (e.g., whether or not the ROI 232 is included within the image frame 226). The ML model may be relatively small and may be configured to function on ROIs rather than entire images. Thus, the classifier may be configured to function to save power and latency through its relatively small ML model.

In some implementations, the wearable computing device 100 may use an ROI classifier that executes a ML model to compute an ROI dataset (e.g., ROIs 232). In some examples, the ROIs 232 represent an example of the object location data and/or a bounding box dataset. The ROIs 232 may be data that defines the location in which the ROIs are located within the image frame(s) 226.

In operation, the wearable computing device 100 may receive or capture image content (e.g., a plurality of images/frames) at a dual resolution image sensor (e.g., image sensor 216). The image content may be a low resolution image that is sent to the low resolution image signal processor 222 while also sending a high resolution image of the plurality of images/frames to the high resolution image signal processor 224. The low resolution image may then be sent to an onboard machine learning model, such as neural networks 254. The NNs 254 can utilize the ROI detector 230 to identify one or more ROIs (e.g., text, objects, images, frames, pixels, etc.). The identified ROIs may each be associated with determined cropping coordinates 238. The wearable computing device 100 may transmit such cropping coordinates 238 to the high resolution image signal processor 224 to cause cropping of the high resolution image based on the crop coordinates of the low resolution image corresponding to the detected ROIs. The cropped images are smaller than the original high resolution images and as such the wearable computing device 100 may perform machine learning activities (e.g., OCR, object detection, etc.) on the cropped images using NNs 254.

In some implementations, the wearable computing device 100 may perform other vision-based algorithms on the cropped region. For example, object recognition may be performed on the cropped region to identify and utilize information associated with the recognized object(s). For example, particular products, landmarks, store fronts, plants, animals, and/or other various generic objects and/or object classifiers may be recognized and used as input to determine additional information for the user. In some implementations, barcode recognition and reading may be performed on the cropped region to identify and provide additional information on wearable computing device 100 that may be displayed, audibly provided, or other output. In some implementations, face detection may be performed on the cropped region to enable placement of AR and/or VR content on the recognized face, to capture particular features of the recognized face, to count particular features of the face, etc. In some implementations, feature tracking (e.g., feature point detection may be performed on the cropped region to track object motion and/or user motion.

Figure 3A:
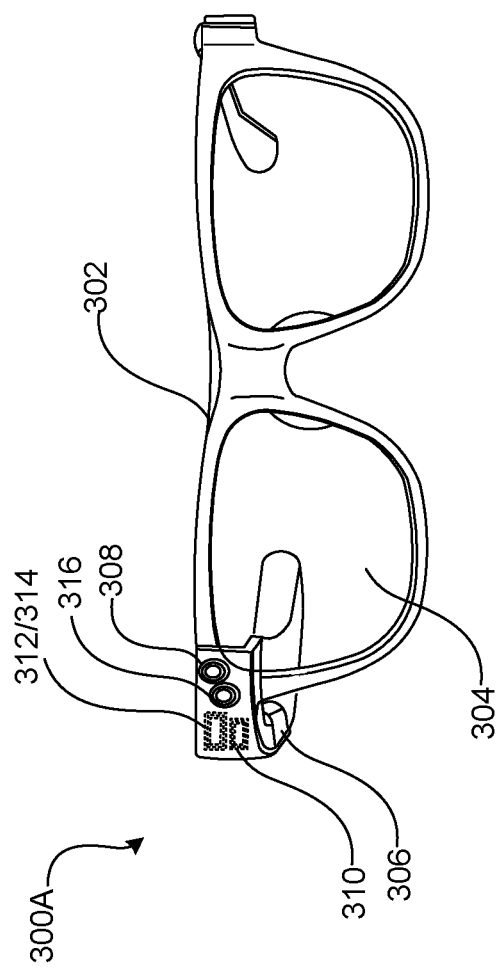
FIGS. 3A and 3B illustrate an example of a wearable computing device, according to implementations described throughout this disclosure.
Figure 3B:
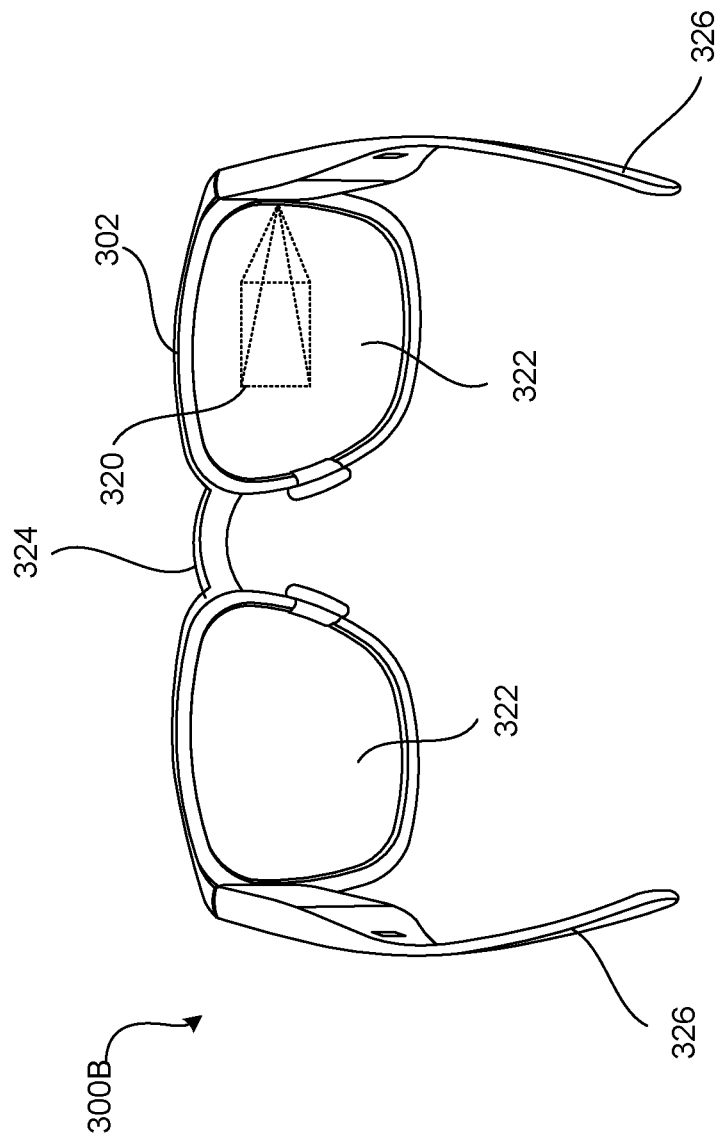

FIGS. 3A and 3B illustrate various views of an example of an AR wearable computing device, according to implementations described throughout this disclosure. FIG. 3A is a front view of an example of a wearable computing device, according to implementations described throughout this disclosure. In this example, the wearable computing device is a pair of AR glasses 300A (e.g., wearable computing device 100 in FIG. 1). In general, the AR glasses 300A may include any or all components of system 200. AR glasses 300A may also be indicated as smart glasses representing an optical head-mounted display device designed in the shape of a pair of eyeglasses. For example, smart glasses are glasses that add information (e.g., project a display) alongside what the wearer views through the glasses.

Although AR glasses 300A are shown as the wearable computing device described herein, other types of wearable computing devices are possible. For example, the wearable computing device may include any battery-powered device including, but not limited to a head-mounted display (HMD) device such as an optical head-mounted display (OHMD) device, a transparent heads-up display (HUD) device, an augmented reality (AR) device, or other devices such as goggles or headsets having sensors, display, and computing capabilities. In some examples, the wearable computing device 300A may be a watch, a mobile device, a piece of jewelry, a ring controller, or other wearable controller.

As shown in FIG. 3A, the AR glasses 300A include a frame 302, with a display device 304 coupled in the frame 302 (or in the glass portion of frame 302). The AR glasses 300A also include an audio output device 306, an illumination device 308, a sensing system 310, a control system 312, at least one processor 314, and a camera 316.

The display device 304 may include a see-through near-eye display such as those using birdbath or waveguide optics. For example, such an optical design may project light from a display source onto a portion of teleprompter glass functioning as a beamsplitter seated at a 45 degree angle. The beamsplitter may allow for reflection and transmission values that allow the light from the display source to be partially reflected while the remaining light is transmitted through. Such an optic design may allow a user to see both physical items in the world next to digital images (e.g., UI elements, virtual content, etc.) generated by the display. In some implementations, waveguide optics may be used to depict content on display device 304 of AR glasses 300A.

The audio output device 306 (e.g., one or more speakers) may be coupled to the frame 302. The sensing system 310 may include various sensing devices and the control system 312 including various control system devices to facilitate operation of the AR glasses 300A. The control system 312 may include a processor 314 operably coupled to the components of the control system 312.

The camera 316 may be capable of capturing still and/or moving images. In some implementations, the camera 316 may be a depth camera that can collect data related to distances of external objects from the camera 316. In some implementations, the camera 316, may be a point tracking camera that can, for example, detect and follow one or more optical markers on an external device, such as, for example, optical markers on an input device or finger on a screen. In some implementations, the AR glasses 300A may include an illumination device 308 that may selectively operate, for example, with the camera 316, for detection of objects (e.g., virtual and physical) in the field of view of the camera 316. The illumination device 308 may selectively operate, for example, with the camera 316, for detection of objects in the field of view of the camera 316.

The AR glasses 300A may include a communication module (e.g., communication module 252) in communication with processor 314 and control system 312. The communication module may provide for communications between devices housed within AR glasses 300A as well as communication with external devices, such as, for example, controllers, mobile devices, servers, and/or other computing devices. The communication module may enable the AR glasses 300A to communicate to exchange information with another computing device and authenticate other devices within range of the AR glasses 300A or other identifiable element in the environment. For example, the AR glasses 300A may be operably coupled to another computing device, to facilitate communication via, for example, a wired connection, a wireless connection via for example, Wi-Fi or Bluetooth, or other type of connection.

FIG. 3B is a rear view 300B of the AR glasses 300A, according to implementations described throughout this disclosure. The AR glasses 300B may be an example of the wearable computing device 100 of FIG. 1. The AR glasses 300B are glasses that add information (e.g., project a display 320) alongside what the wearer views through the glasses. In some implementations, instead of projecting information, the display 320 is an in-lens micro display. In some implementations, AR glasses 300B (e.g., eyeglasses or spectacles), are vision aids, including lenses 322 (e.g., glass or hard plastic lenses) mounted in the frame 302 that holds the lenses in front of a person's eyes, typically utilizing a bridge 324 over the nose, and bows 326 (e.g., temples or temple pieces) which rest over the ears.

Figure 4A:
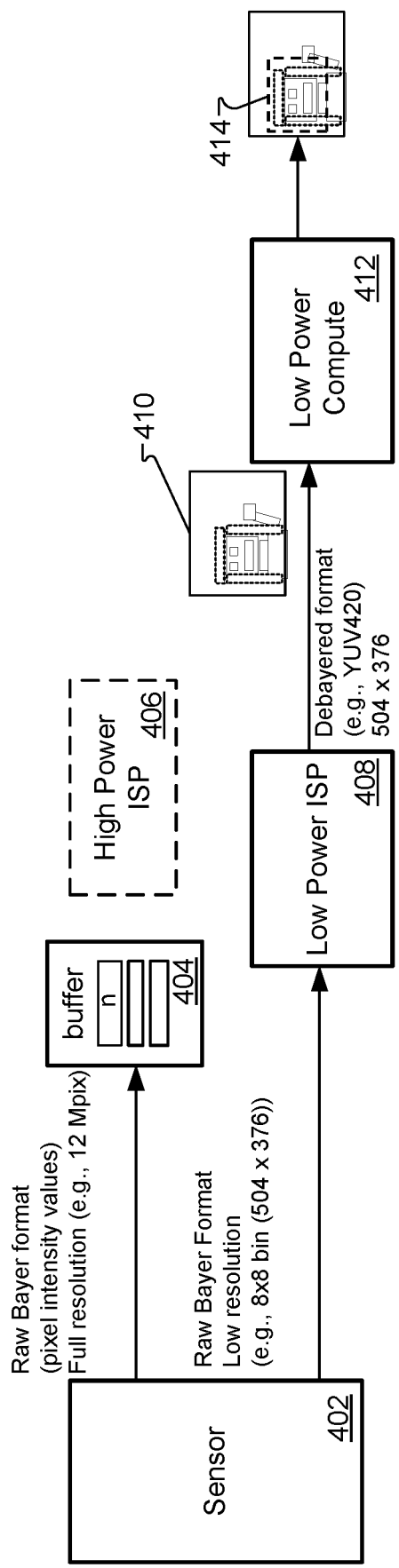
FIGS. 4A-4C illustrate example flow diagrams for performing image processing tasks on a wearable computing device, according to implementations described throughout this disclosure.
Figure 4B:
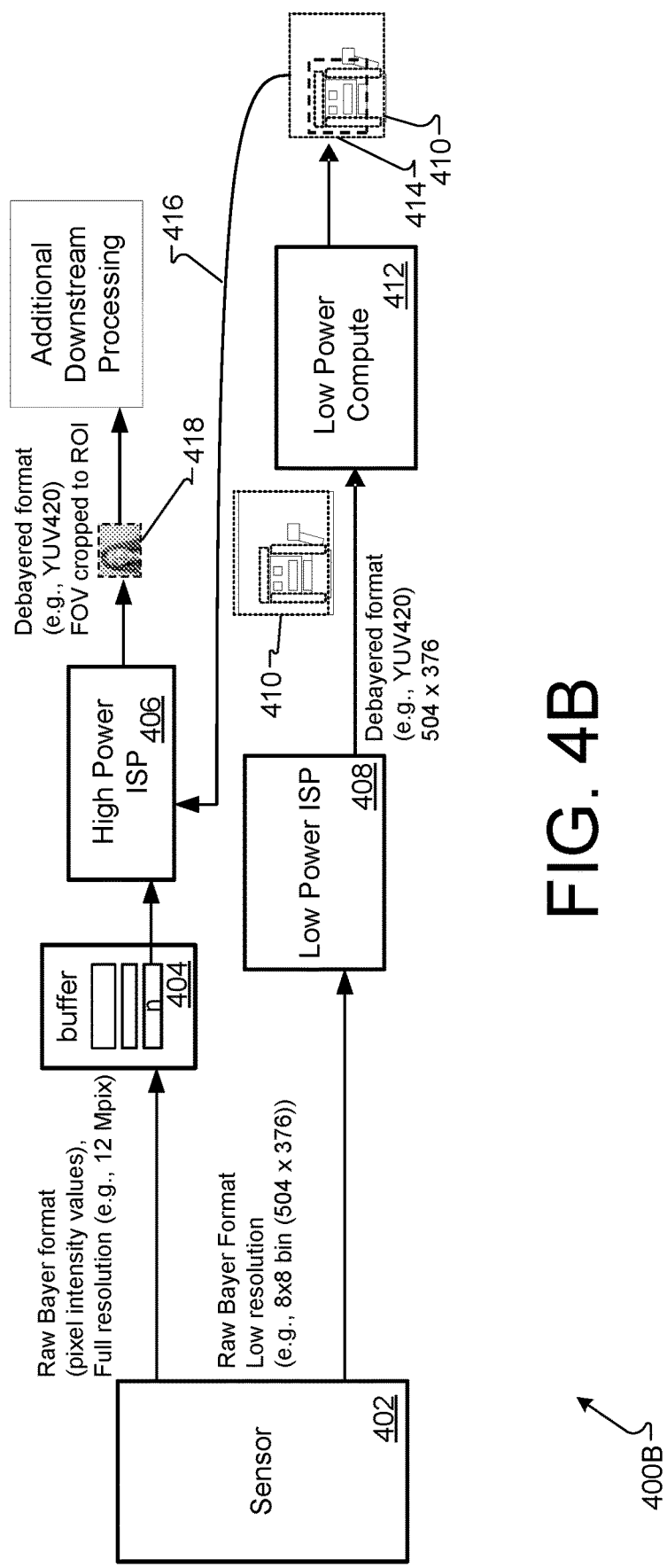
Figure 4C:
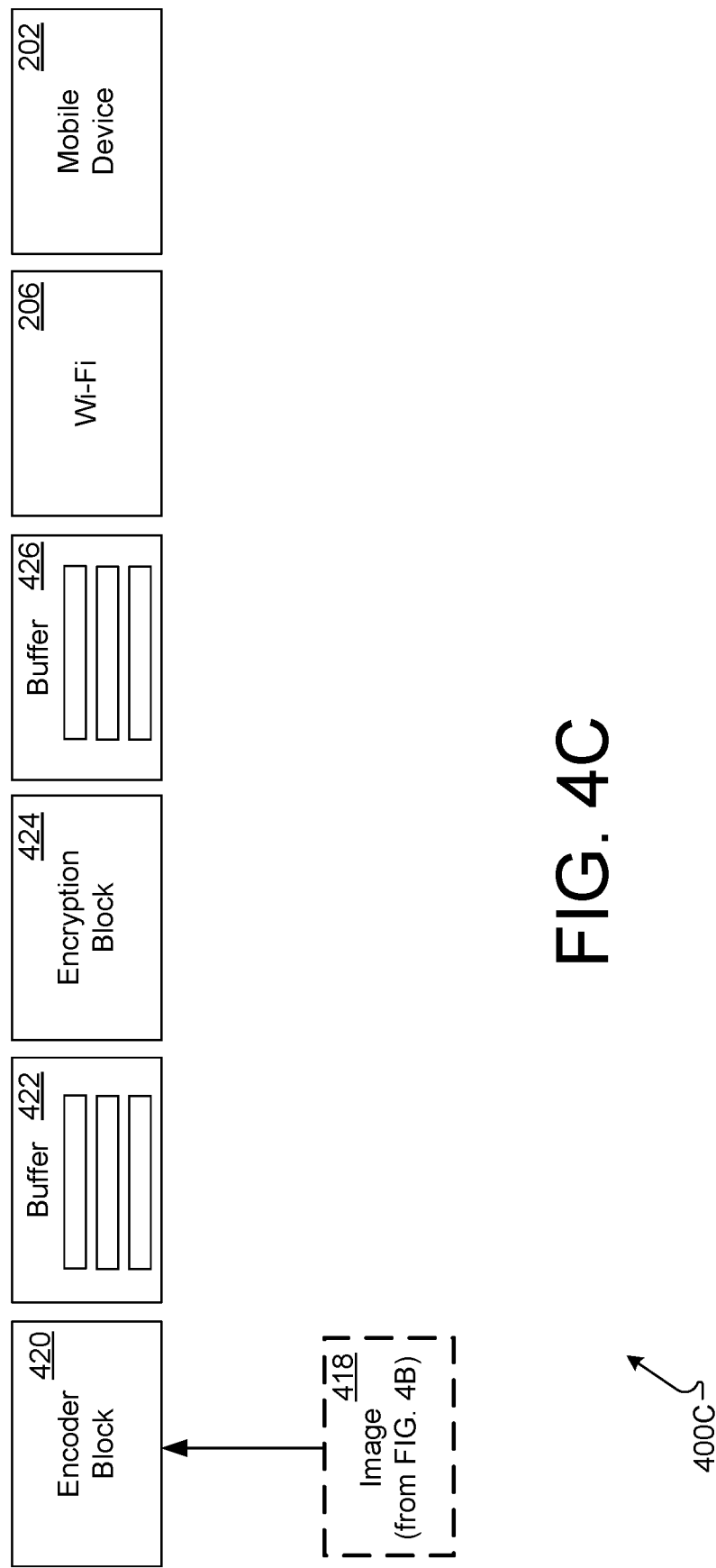

FIGS. 4A-4C illustrate example flow diagrams 400A, 400B, and 400C for performing image processing tasks on a wearable computing device, according to implementations described throughout this disclosure. For example, the flow diagrams 400A-400C may be carried out by wearable computing device 100 using one or more image sensors 216. In the examples of diagrams 400A-400C, the sensor 402 may function in a dual stream mode in which the sensor 402 continuously and simultaneously processes both incoming (or captured) low resolution image streams and incoming (or captured) high resolution image streams.

FIG. 4A is a flow diagram 400A that illustrates the use of an image sensor 402 installed in a wearable computing device and configured to capture or receive streams of image data. The sensor 402 may capture and output two streams of image content. For example, the sensor 402 may obtain a plurality of high resolution image frames (e.g., full resolution of the camera/sensor 402) that are captured with a full field of view. The plurality of high resolution image frames may be stored in a buffer 404. In general, a high power image signal processor 406 may be optionally available to perform analysis of the high resolution image frames.

In addition, the sensor 402 may (simultaneously) obtain a plurality of low resolution image frames that are captured with the full field of view. The low resolution image frames may be provided to a low power image signal processor 408. The processor 408 processes the low resolution image frames to generate a stream of images 410 (e.g., one or more images) that are debayered, color corrected, and shade-corrected image (e.g., a YUV-formatted image stream).

The low power image signal processor 408 may perform low power computations 412 to analyze the generated stream of images 410 to detect an object and/or region of interest 414 within image(s) 410. The detection may include hand detection, object detection, paragraph, detection, and the like. When an object of interest and/or ROI is detected and the detection of such a region or object meets a threshold condition, a bounding box of the object and/or region is identified. The threshold condition may represent a particular high level of quality for an object or region in an image frame of the stream of images. For example, a threshold condition may pertain to any or all of determining that the object or region is in focus, still with low blur, and/or has the correct exposure. The bounding box may represent cropping coordinates of each of four corners of the box. In some implementations, the bounding box may not be box-shaped, but may instead be triangular, circular, elliptical, or other shape.

FIG. 4B is a flow diagram 400B that illustrates the use of the image sensor 402 installed in a wearable computing device and configured to capture or receive streams of image data. Similar to FIG. 4A, the sensor 402 may capture and output two streams of image content, the plurality of high resolution image frames and the plurality of low resolution image frames. The plurality of high resolution image frames may be provided to the buffer 404.

The low resolution image frames may be provided to the low power image signal processor 408. The processor 408 processes the low resolution image frames to generate the stream of images 410 (e.g., one or more images) that are debayered, color corrected, and shade-corrected image (e.g., a YUV-formatted image stream).

The low power image signal processor 408 may perform low power computations 412 to analyze the generated stream of images 410 to detect an object and/or region of interest 414 within the image(s) 410. When an object of interest and/or ROI is detected and the detection of such a region or object meets a threshold condition, a bounding box of the object and/or region is identified. The threshold condition may represent a particular high level of quality for an object or region in an image frame of the stream of images. For example, a threshold condition may pertain to any or all of determining that the object or region is in focus, still with low blur, and/or has the correct exposure. The bounding box may represent cropping coordinates representing the region or object of interest 414. Once the object or region of interest 414 is determined and the threshold condition(s) have been met, the high power image signal processor 406 retrieves (or receives), from the buffer 404, the high resolution image frames (e.g., raw frames that match a same capture time as the low resolution image frames in which the object or region of interest was identified).

For example, the cropping coordinates and the retrieved high resolution image frames may be provided (e.g., arrow 416) as input to the high power image signal processor 406. The high power image signal processor 406 may output a processed (e.g., debayered, color corrected, shading corrected, etc.) image 418 that is cropped to the object and/or region of interest determined from the low resolution image frames. This cropped, full resolution image 418 may be provided to additional onboard or offboard devices for further processing.

In some implementations, rather than a plurality of image frames, a single high resolution image may be processed through the high power image signal processor to save computational and/or device power. Further computational and/or device power may also be accrued by further downstream processing because such downstream processing may operate on the cropped image 418, rather than the entire high resolution image.

In general, the low power image signal processor 408 may not continue processing the stream of low resolution image frames after objects and/or regions of interest are identified. In some implementations, the low power image signal processor 408 may be placed in a standby mode to await further quality metrics for the previously provided/identified image frames. In some implementations, the sensor 402 may continue to trigger performance of perception functions (i.e., ML processing) on the low resolution image stream, which may further impact the output to downstream functions.

FIG. 4C is a flow diagram 400C that illustrates examples of additional downstream processing. As shown, the cropped image 418 represents a region of interest. The cropped image 418 is a high resolution image that may be transmitted to an encoder (e.g., compression) block without buffering the image 418 (or images) in memory. The compressed output of the encoder is buffered in a buffer 422 and encrypted by an encryption block 424. The encrypted image 418 may be buffered in a buffer 426 and sent, via Wi-Fi (e.g., network 206) for example, to a companion mobile computing device 202. The mobile computing device 202 may be configured to include computational power, memory, and battery capacity to support complex processing than is supported on the wearable computing device 100, for example. Because the additional downstream processing utilizes a cropped version of the image content, rather than the full image, the downstream processing also benefits from saving computation, memory, and battery power. For example, a larger amount of power is used to send additional packets over Wi-Fi for a larger image, rather than the cropped image 418.

Figure 5A:
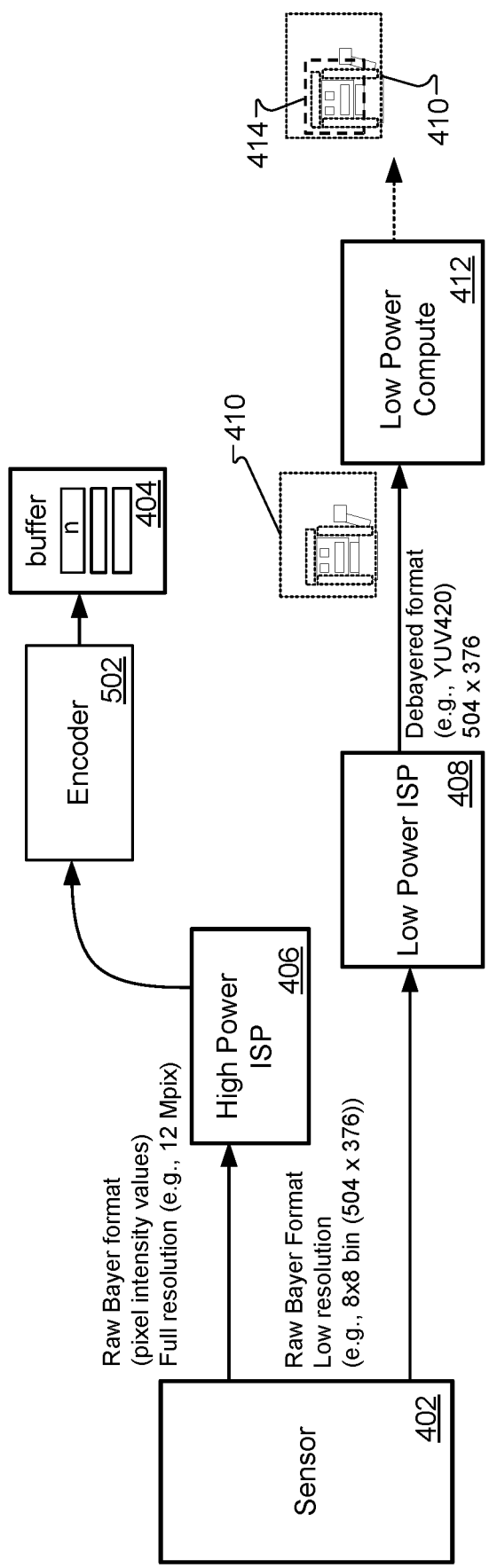
FIGS. 5A and 5B illustrate example flow diagrams for performing image processing tasks on a wearable computing device, according to implementations described throughout this disclosure.
Figure 5B:
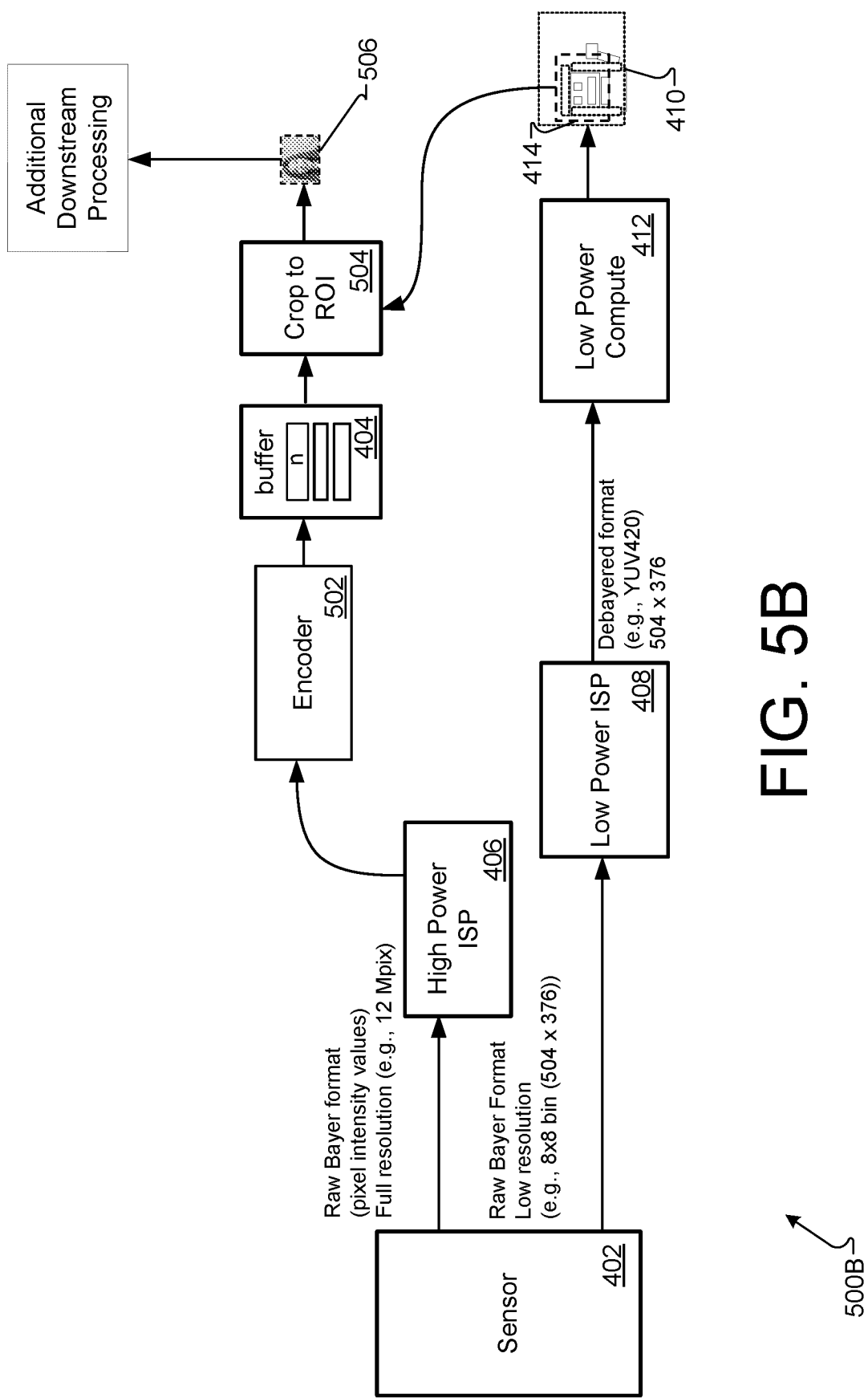

FIGS. 5A and 5B illustrate example flow diagrams 500A and 500B for performing image processing tasks on a wearable computing device, according to implementations described throughout this disclosure. For example, the flow diagrams 500A and 500B may be carried out by wearable computing device 100 using one or more image sensors 216. In the examples of diagrams 500A and 500B, the sensor 402 may function in a dual stream mode in which the sensor 402 continuously and simultaneously processes both incoming (or captured) low resolution image streams and incoming (or captured) high resolution image streams.

FIG. 5A is a flow diagram 500A that illustrates the use of the image sensor 402 installed in a wearable computing device 100, for example, and configured to capture or receive streams of image data. The sensor 402 may capture and output two streams of image content. For example, the sensor 402 may obtain a plurality of high resolution image frames (e.g., full resolution of the camera/sensor 402) that are captured with a full field of view. In this example, the plurality of high resolution image frames may be processed by the high power image signal processor 406. The processed high resolution image frames may then be encoded (e.g., compressed) by encoder 502 and stored in the buffer 404. This provides an advantage of saving buffer memory and memory bandwidth of storing the high resolution image frames before compression. This example instead compresses and stores the compressed version of the high resolution image frames rather than the uncompressed original image frames.

In addition, the sensor 402 may (simultaneously) obtain a plurality of low resolution image frames that are captured with the full field of view. The low resolution image frames may be provided to a low power image signal processor 408. The processor 408 processes the low resolution image frames to generate a stream of images 410 (e.g., one or more images) that are debayered, color corrected, and shade-corrected image (e.g., a YUV-formatted image stream).

The low power image signal processor 408 may perform low power computations 412 to analyze the generated stream of images 410 to detect an object and/or region of interest 414 within image(s) 410. The detection may include hand detection, object detection, paragraph, detection, and the like. When an object of interest and/or ROI is detected and the detection of such a region or object meets a threshold condition, a bounding box of the object and/or region is identified. The threshold condition may represent a particular high level of quality for an object or region in an image frame of the stream of images. For example, a threshold condition may pertain to any or all of determining that the object or region is in focus, still with low blur, and/or has the correct exposure. The bounding box may represent cropping coordinates of each of four corners of the box, for example.

FIG. 5B is a flow diagram 500B that illustrates a process for generating partial image content from one or more image frames 410, for example. Similar to FIG. 5A, the sensor 402 may capture and output two streams of image content including the at least one high resolution image frame and at least one low resolution image frame. In this example, the at least one high resolution image frame may be processed by the high power image signal processor 406. The processed high resolution image frames may then be encoded (e.g., compressed) by encoder 502 and stored in the buffer 404.

In addition, the sensor 402 may (simultaneously) obtain the at least one low resolution image frame, which may be provided to the low power image signal processor 408. The processor 408 processes the at least one low resolution image frame to generate at least one image 410 that is debayered, color corrected, and shade-corrected image (e.g., a YUV-formatted image).

The low power image signal processor 408 may perform low power computations 412 to analyze the at least one image 410 to detect an object and/or region of interest 414, for example, within the at least one image 410. The detection may include hand detection, object detection, paragraph, detection, and the like. When an object of interest and/or ROI is detected and the detection of such a region or object meets a threshold condition, a bounding box of the object and/or region is identified. The threshold condition may represent a particular high level of quality for an object or region in an image frame of the stream of images. For example, a threshold condition may pertain to any or all of determining that the object or region is in focus, still with low blur, and/or has the correct exposure. The bounding box may represent cropping coordinates of each of four corners of the box, for example.

Once the ROI or object of interest is determined and the threshold condition has been met, the cropping coordinates (e.g., cropping coordinates 238) may be transmitted to or obtained by a cropper (e.g., cropper 236). The flow diagram 500B may then retrieve the at least one high resolution image from the buffer 404. The retrieved high resolution image is then cropped 504 to the region or object of interest according to the cropping coordinates determined for the low resolution image. The high resolution image generally has the same capture time as the low resolution image in which the region or object of interest was identified. The output of the crop may include a cropped portion 506 of the high resolution image. Additional downstream processing may be carried out onboard or offboard the wearable computing device 100.

Unlike conventional image analysis that occurs on devices with higher computational and power resources, the systems described herein may avoid continuous processing of high resolution imagery. In addition, the systems described herein may avoid computational resources for scaling, as no scaling is performed by wearable computing device 100. In addition, typical image analysis systems that utilize both a low resolution image stream and a high resolution image stream use separate buffered storage for each stream. The systems described herein utilize a buffer for the high resolution images and avoid use of buffers for low resolution images which provides the advantage of less memory traffic and/or memory.

Figure 6A:
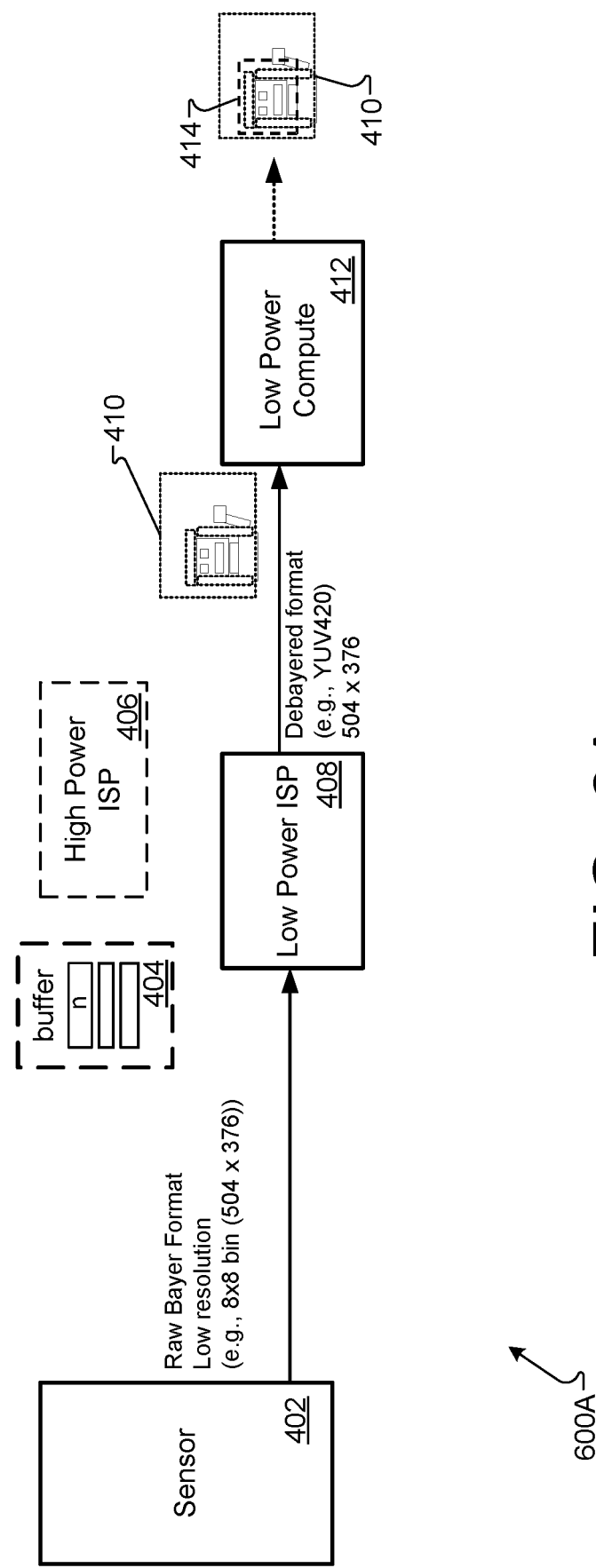
FIGS. 6A-6C illustrate example flow diagrams for performing image processing tasks on a wearable computing device, according to implementations described throughout this disclosure.
Figure 6B:
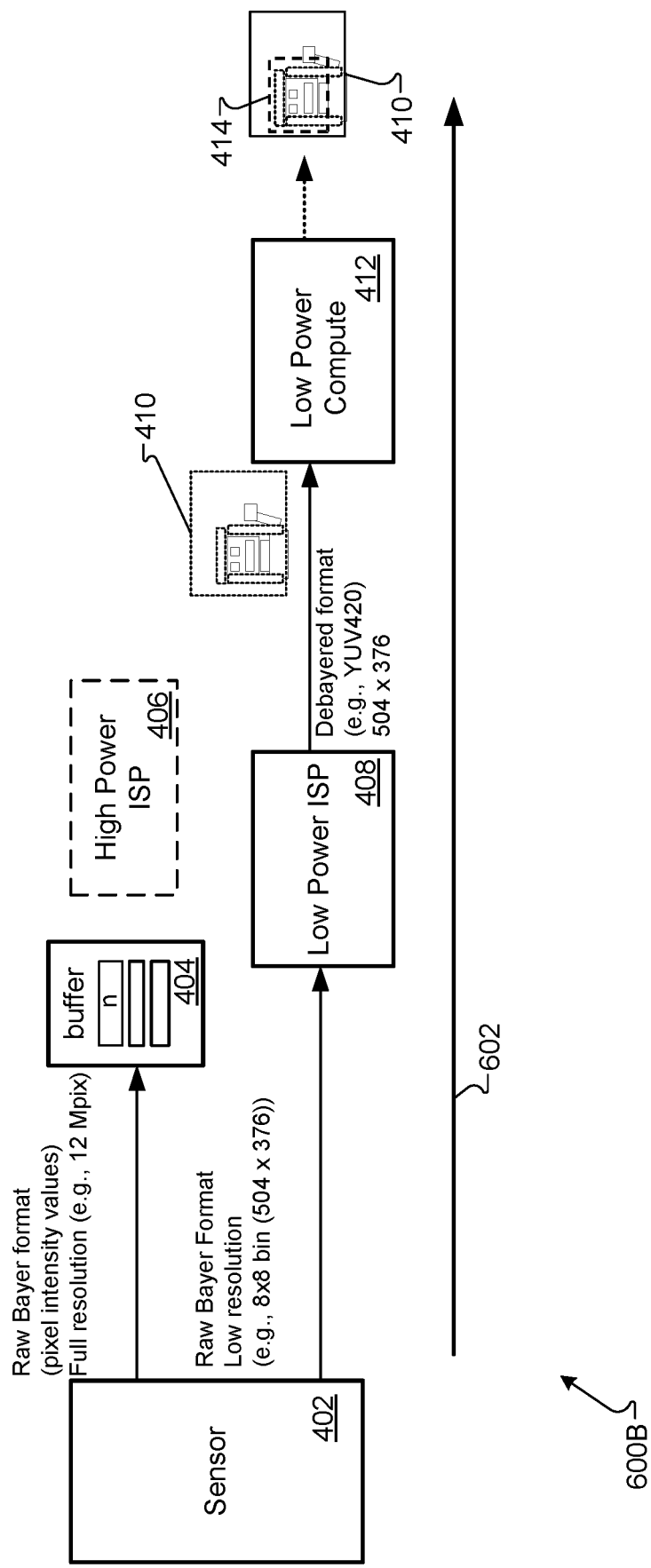
Figure 6C:
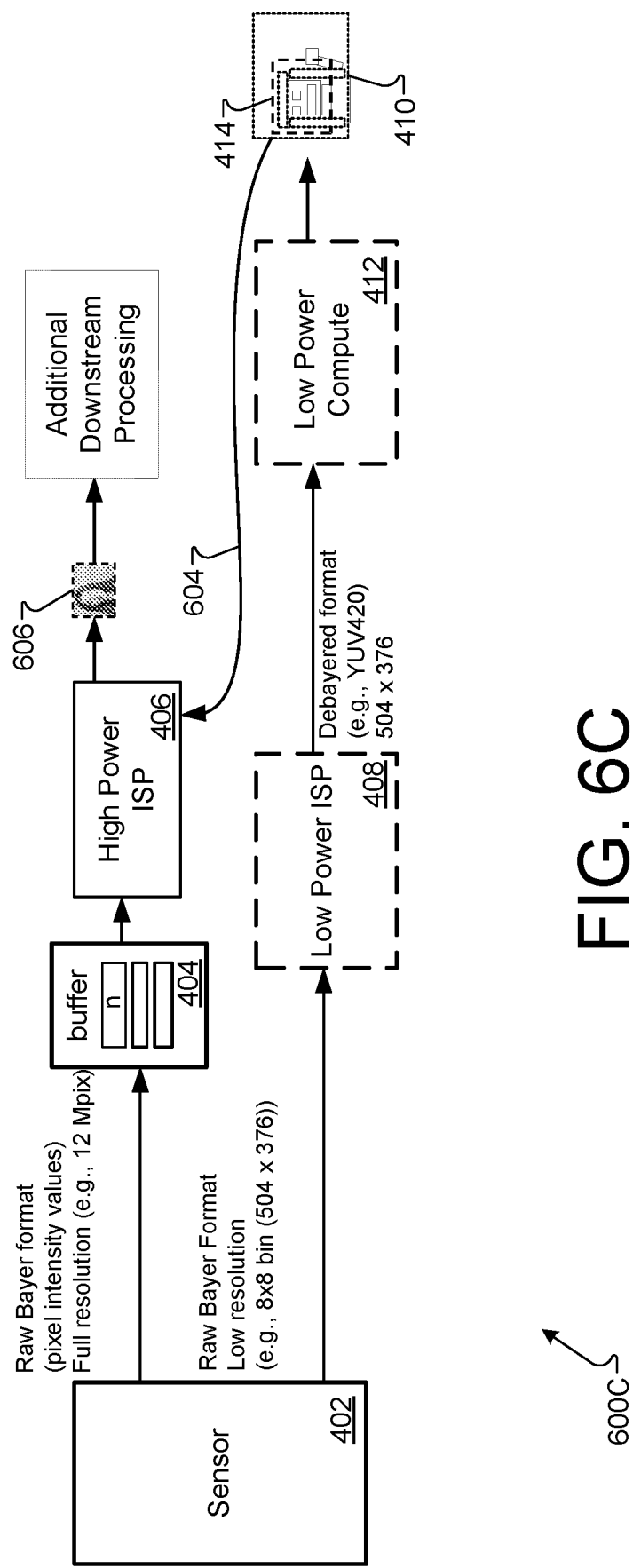

FIGS. 6A-6C illustrate example flow diagrams 600A, 600B, and 600C for performing image processing tasks on a wearable computing device 100, according to implementations described throughout this disclosure. In the examples of diagrams 600A-600C, the sensor 402 may function in a single stream mode in which the sensor 402 processes a single mode analyzing either incoming (or captured) low resolution image streams or incoming (or captured) high resolution image streams. The sensor 402 may then be triggered to function in a dual stream mode to continuously and simultaneously process both incoming (or captured) low resolution image streams and incoming (or captured) high resolution image streams.

FIG. 6A is a flow diagram 600A that illustrates the use of the image sensor 402 installed in the wearable computing device 100, for example. The sensor 402 may be configured to switch between dual mode processing and single mode processing. For example, the sensor 402 may first function in a mode that streams/captures the low resolution image stream (e.g., a plurality of sequential image frames). Such a mode may save computational power and battery power for wearable computing device 100 because high resolution image analysis is avoided at a first capture and/or image retrieval stage. The buffer 404 and high power image signal processor 406 may be available for use, but in this example are disabled.

In operation, the low resolution image frames may be provided to the low power image signal processor 408. The processor 408 processes the low resolution image frames to generate a stream of images 410 (e.g., one or more images) that are debayered, color corrected, and shade-corrected image (e.g., a YUV-formatted image stream). The low power image signal processor 408 may perform low power computations 412 to analyze the generated stream of images 410 to detect an object and/or region of interest 414 within image(s) 410. The detection may include hand detection, object detection, paragraph, detection, and the like.

When an object of interest and/or ROI is detected and the detection of such a region or object meets a threshold condition, a bounding box of the object and/or region is identified. The threshold condition may represent a particular high level of quality for an object or region in an image frame of the stream of images. For example, a threshold condition may pertain to any or all of determining that the object or region is in focus, still with low blur, and/or has the correct exposure. The bounding box may represent cropping coordinates of each of four corners of the box, for example. The identification of the region or object of interest and the cropping coordinates may be a trigger to enable the sensor 402 to begin operating in a dual stream mode.

In some implementations, the trigger to start the dual stream mode may occur when several threshold conditions are met, but not all. For example, the wearable computing device 100 may recognize an object of interest that meets a threshold condition for camera focus and a threshold condition for camera exposure. However, since the object may be moving (e.g., and may have motion blur), the wearable computing device 100 may trigger use of the dual stream mode in order to prepare to capture a high resolution image using processor 118 when the final condition is met. This may be beneficial when there is a delay of several frames to switch on the dual stream mode. That is, the time period when the dual stream mode is executing may be a transition time period that is entered when nearly all threshold conditions are met and the final threshold condition to detect and determine is predicted to occur in the upcoming image frames.

FIG. 6B is a flow diagram 600B that illustrates the use of the image sensor 402 installed in the wearable computing device 100 where the sensor 402 is switched into a dual stream mode. The trigger to switch into dual stream mode may include the detection of one or more objects or regions of interest. The dual stream mode triggers the sensor 402 to begin capturing (or otherwise obtaining) high resolution image frames in addition to the already streaming low resolution image frames. In some implementations, a number of image frames of the high resolution image streams may be used to configure automatic gain measurements, exposure settings, and focus settings. Once the configurations are complete for the high resolution image stream, the streams may be synchronized and the low resolution image frames may continue through the same flow as in FIG. 6A, as shown by arrow 602. However, the sensor 402 may use a processor to begin to buffer (using buffer 404) the high resolution image frames. The buffer 404 may be smaller than a buffer used when the sensor operates in a continuous dual stream mode from the beginning of image streaming.

FIG. 6C is a flow diagram 600C that illustrates the use of an image sensor 402 installed in a wearable computing device 100 and configured to capture or receive streams of image data after being switched from single mode streaming to dual mode streaming. In operation, the sensor 402 may obtain a plurality of high resolution image frames (e.g., full resolution of the camera/sensor 402) that are captured with a full field of view. The plurality of high resolution image frames may be stored in the buffer 404.

The low resolution image frames continue to be captured and/or obtained by sensor 402 and may be provided to the low power image signal processor 408. The processor 408 processes the low resolution image frames to generate the stream of images 410 (e.g., one or more images) that are debayered, color corrected, and shade-corrected image (e.g., a YUV-formatted image stream). The low power image signal processor 408 may perform low power computations 412 to analyze the generated stream of images 410 to detect an object and/or region of interest 414 within the image(s) 410. When an object of interest and/or ROI is detected and the detection of such a region or object meets a threshold condition, a bounding box of the object and/or region is identified.

The threshold condition may represent a particular high level of quality for an object or region in an image frame of the stream of images. For example, a threshold condition may pertain to any or all of determining that the object or region is in focus, still with low blur, and/or has the correct exposure. The bounding box may represent cropping coordinates representing the region or object of interest 414. Once the object or region of interest 414 is determined and the threshold condition(s) have been met, the high power image signal processor 406 retrieves (or receives), from the buffer 404, the high resolution image frames (e.g., raw frames that match a same capture time as the low resolution image frames in which the object or region of interest was identified).

The cropping coordinates and the retrieved high resolution image frames may be provided (e.g., arrow 604) as input to the high power image signal processor 406. The high power image signal processor 406 may output a processed (e.g., debayered, color corrected, shading corrected, etc.) image 606 that is cropped to the object and/or region of interest determined from the low resolution image frames. This cropped, full resolution image 606 may be provided to additional onboard or offboard devices for further processing.

Figure 7A:
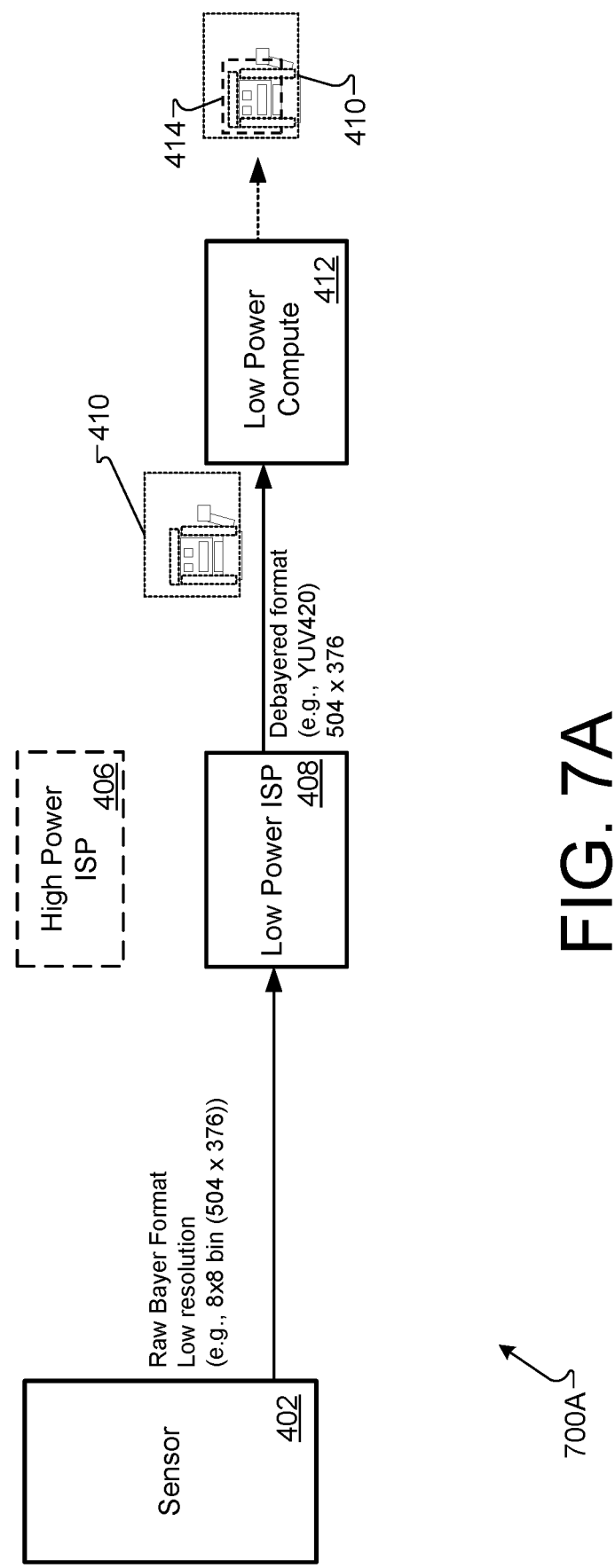
FIGS. 7A-7C illustrate example flow diagrams for performing image processing tasks on a wearable computing device, according to implementations described throughout this disclosure.
Figure 7B:
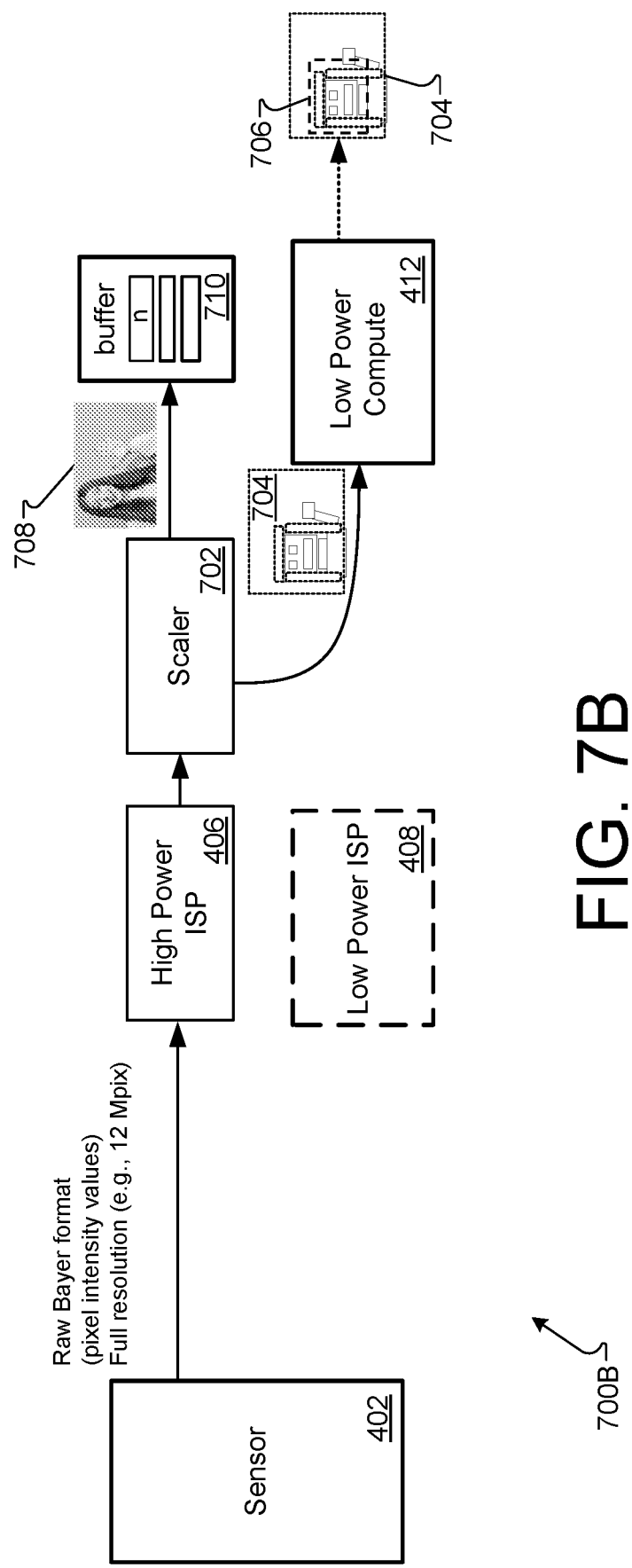
Figure 7C:
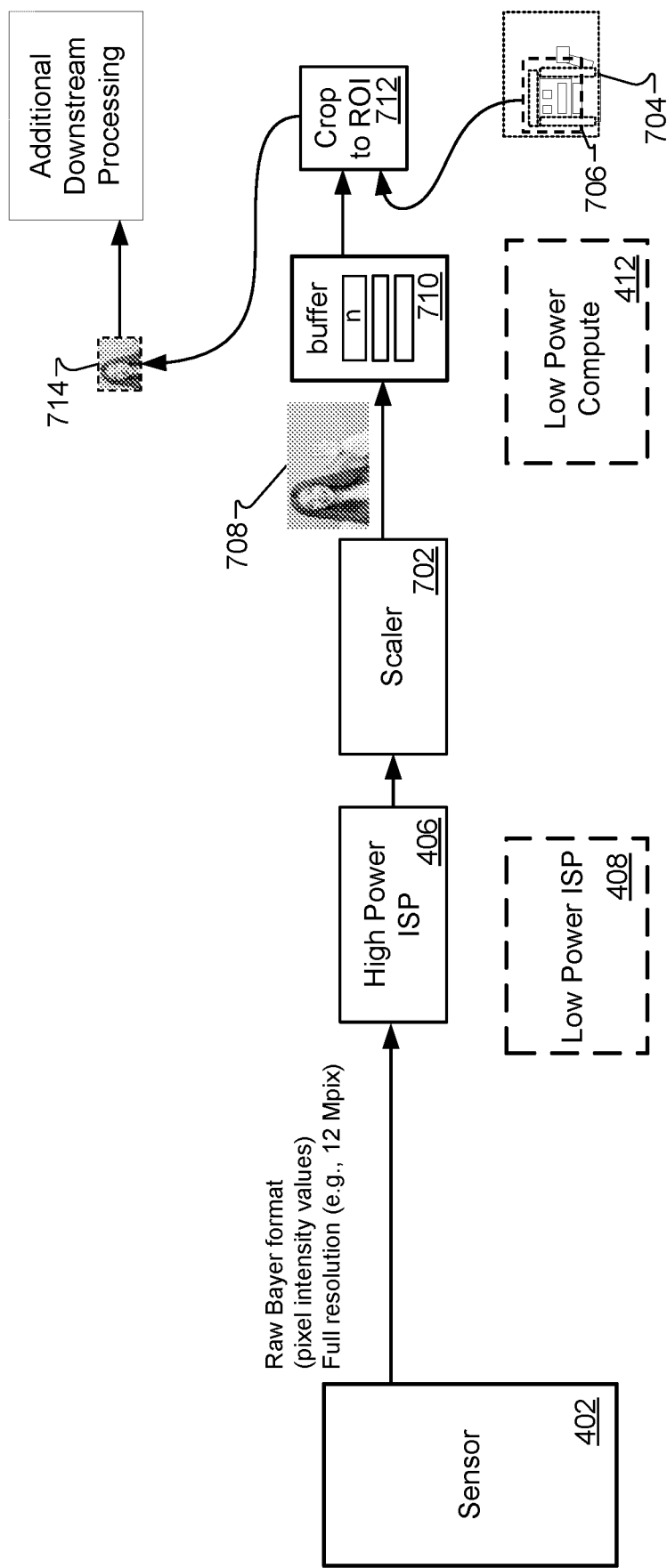

FIGS. 7A-7C illustrate example flow diagrams 700A, 700B, and 700C for performing image processing tasks on a wearable computing device 100, according to implementations described throughout this disclosure. In the examples of diagrams 700A-700C, the sensor 402 may function in a first mode and then may be triggered to function in a second mode. For example, the sensor 402 may be triggered to begin streaming and/or capturing content in a low resolution streaming mode in which low resolution images are captured and utilized. Upon detecting one or more objects and/or regions of interest, the sensor 402 may switch to a high resolution streaming mode in which high resolution images are utilized.

FIG. 7A is a flow diagram 700A that illustrates the use of the image sensor 402 installed in the wearable computing device 100, for example. In this example, the sensor 402 may first function in a low resolution streaming mode that streams and/or captures (or otherwise obtains) the low resolution image stream (e.g., a plurality of sequential image frames).

In operation, the low resolution image frames may be provided to the low power image signal processor 408. The processor 408 processes the low resolution image frames to generate a stream of images 410 (e.g., one or more images) that are debayered, color corrected, and shade-corrected image (e.g., a YUV-formatted image stream). The low power image signal processor 408 may perform low power computations 412 to analyze the generated stream of images 410 to detect an object and/or region of interest 414 within image(s) 410. The detection may include hand detection, object detection, paragraph, detection, and the like.

When an object of interest and/or ROI is detected and the detection of such a region or object meets a threshold condition, a bounding box of the object and/or region is identified. The threshold condition may represent a particular high level of quality for an object or region in an image frame of the stream of images. For example, a threshold condition may pertain to any or all of determining that the object or region is in focus, still with low blur, and/or has the correct exposure. The bounding box may represent cropping coordinates of each of four corners of the box, for example. The identification of the region or object of interest and the cropping coordinates may be a trigger to enable the sensor 402 to switch from the low resolution streaming mode to the high resolution streaming mode.

FIG. 7B is a flow diagram 700B that illustrates the use of the image sensor 402 installed in the wearable computing device 100 where the sensor 402 has been triggered to switch from a low resolution streaming mode to a high resolution streaming mode. The trigger to switch such modes may include the detection of one or more objects or regions of interest. Switching from the low resolution streaming mode to the high resolution streaming mode triggers the sensor 402 to begin capturing (or otherwise obtaining) high resolution image frames while halting the capturing (or otherwise obtaining) of low resolution image frames.

In this example, at least one high resolution image frame may be processed by the high power image signal processor 406. One or more of the processed high resolution image frames may be provided to a scaler 702 to be scaled (e.g., scaled down in resolution) in order to produce a low resolution image 704 (or image stream). The high power image signal processor 406 may perform low power computations 412 on the image 704 (or image stream). The low power computations may include analyzing the at least one image 704 to detect an object and/or region of interest 706, for example, within the at least one image 704. The detection may include hand detection, object detection, paragraph, detection, and the like. When an object of interest and/or ROI is detected and the detection of such a region or object meets a threshold condition, a bounding box of the object and/or region is identified. The threshold condition may represent a particular high level of quality for an object or region in an image frame of the stream of images. For example, a threshold condition may pertain to any or all of determining that the object or region is in focus, still with low blur, and/or has the correct exposure. The bounding box may represent cropping coordinates of each of four corners of the box, for example. The high power image signal processor 406 may also buffer a full high resolution image 708 in a buffer 710. Image 708 may be used for operations that may benefit from a high resolution image.

FIG. 7C is a flow diagram 700C that illustrates the use of an image sensor 402 installed in a wearable computing device 100. The sensor 402 in this example is switched to the high resolution streaming mode in response to determining the cropping coordinates of ROI 706. For example, when the ROI 706 (or object of interest) is determined and the threshold condition has been met, the cropping coordinates (e.g., cropping coordinates 238) may be transmitted to or obtained by a cropper (e.g., cropper 236). The high resolution image 708 may be retrieved from the buffer 710. The retrieved high resolution image 708 is then cropped 712 to the region or object of interest according to the cropping coordinates (e.g., of ROI 706) determined for the low resolution image 704. The high resolution image 708 generally has the same capture time as the low resolution image 704 in which the region or object of interest 706 was identified. The output of the crop may include a cropped portion 714 of the high resolution image. Additional downstream processing may be carried out onboard or offboard the wearable computing device 100.

In some implementations, the sensor 402 may determine when to perform a fast dynamic switch between the use of the low resolution streaming mode and the high resolution streaming mode. For example, the sensor 402 may make a determination for when to provide sensor data (e.g., image data, pixels, optical data, etc.) to the high power image signal processor 406 or the low power image signal processor 408. The determination may be based on detected events that occur with respect to the image streams, for example, with a goal to reduce and/or otherwise minimize power use and system latency. Example detected events may include detecting any one or more of an object, n ROI, a movement or a stop of movement, a lighting change, a new user, another user, another object, etc.

In this example, the wearable computing device 100 may be triggered to operate with content having a low resolution and may switch to content having a high resolution. Because both low and high resolutions of the image streams are available, the wearable computing device 100 may select from the two streams without retrieving content from buffered data. This can save computation switching costs, memory costs, and retrieval of content from memory costs.

Figure 8A:
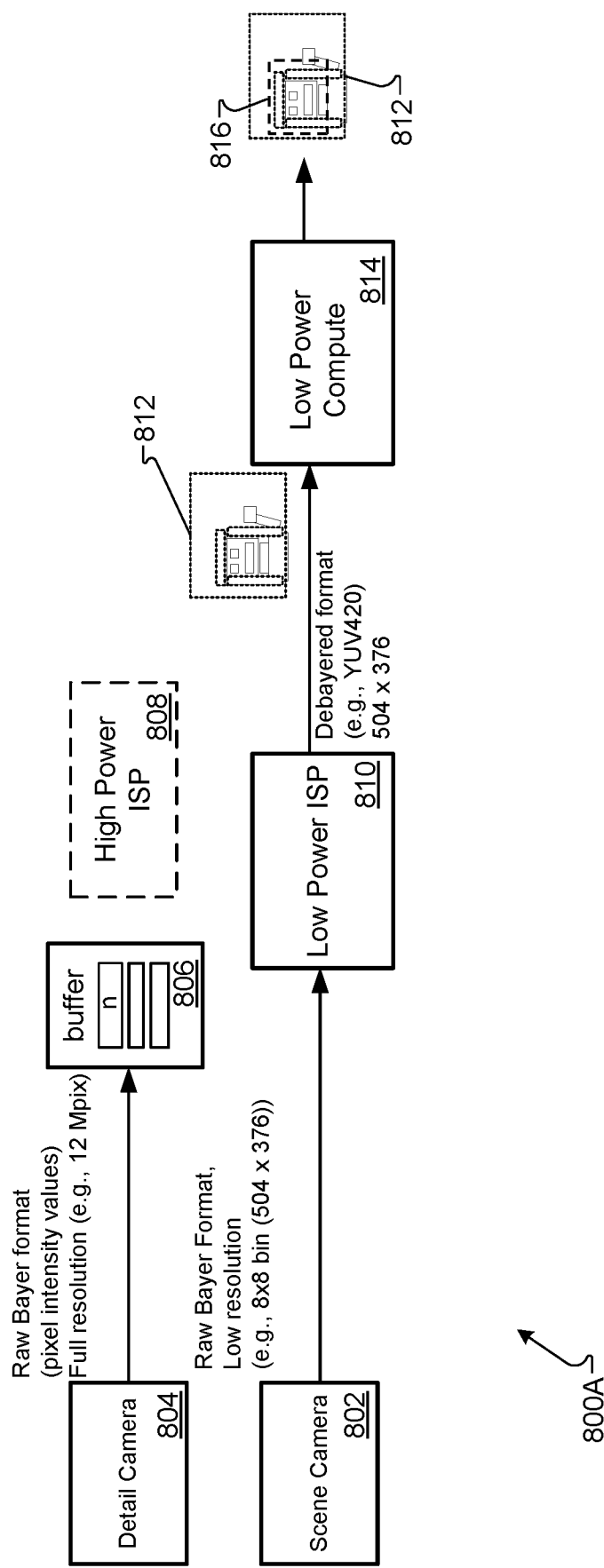
FIGS. 8A and 8B illustrate example flow diagrams for emulating a dual resolution image sensor with a single image sensor to perform image processing tasks, according to implementations described throughout this disclosure.
Figure 8B:
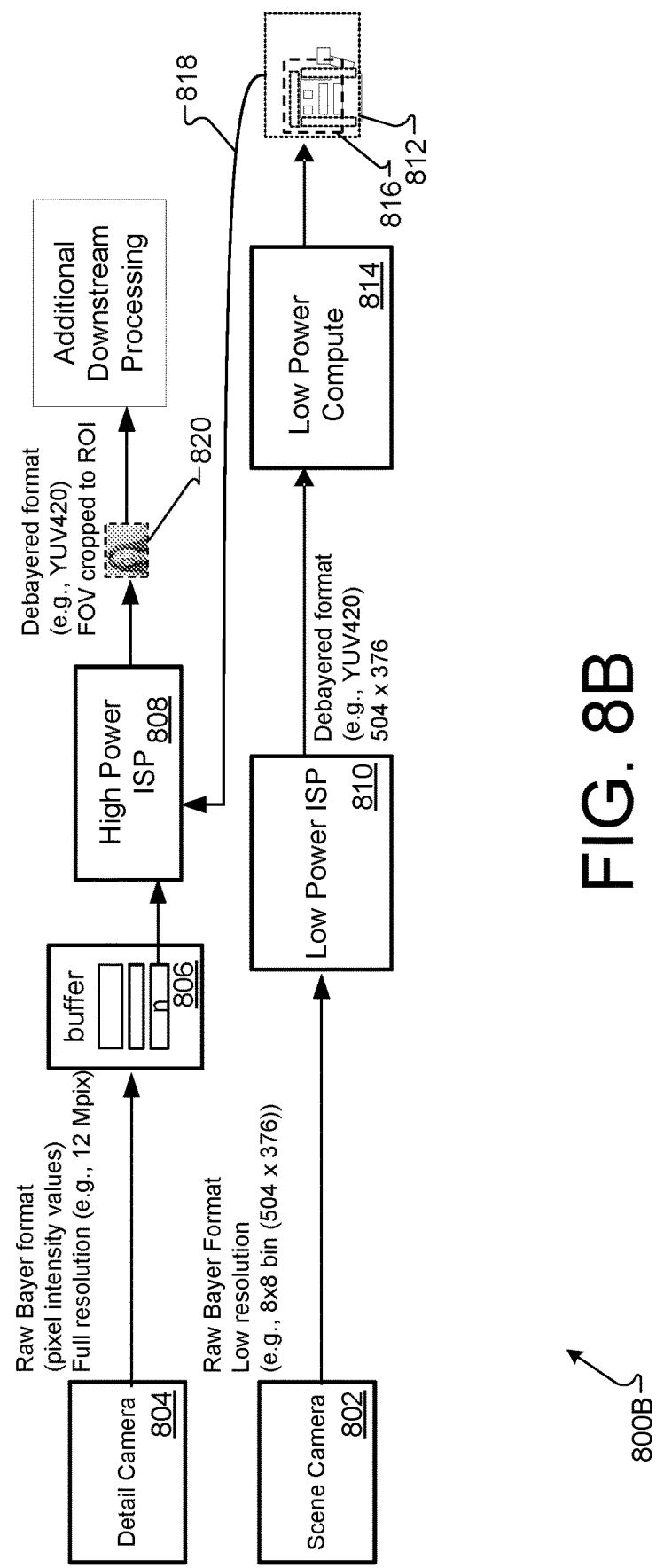

FIGS. 8A and 8B illustrate example flow diagrams 800A and 800B for emulating a dual resolution image sensor with a single image sensor to perform image processing tasks, according to implementations described throughout this disclosure. In this example, a dual stream output sensor (e.g., sensor 402) may be configured to output a first image stream with a wide field of view in low resolution to represent a scene camera 802. Similarly, the sensor may be configured to output a second stream with a narrow field of view in high resolution to represent a detail camera 804.

FIG. 8A is a flow diagram 800A that illustrates the use of an image sensor (e.g., a scene camera 802 and a detail camera 804) installed in a wearable computing device and configured to capture or receive streams of image data. The detail camera 804 may obtain (e.g., capture) and output a high resolution image stream (e.g., a plurality of image frames). The plurality of high resolution image frames may be stored in a buffer 806. In general, a high power image signal processor 808 may be optionally available to perform analysis of the high resolution image frames.

The scene camera 802 may (simultaneously) obtain (e.g., capture) and output a plurality of low resolution image frames. The low resolution image frames may be provided to a low power image signal processor 810. The processor 810 processes the low resolution image frames to generate a stream of images 812 (e.g., one or more images) that are debayered, color corrected, and shade-corrected image (e.g., a YUV-formatted image stream).

The low power image signal processor 810 may perform low power computations 814 to analyze the generated stream of images 812 to detect an object and/or region of interest 816 within image(s) 812. The detection may include hand detection, object detection, paragraph, detection, and the like. When an object of interest and/or ROI is detected and the detection of such a region or object meets a threshold condition, a bounding box of the object and/or region is identified. The bounding box may represent cropping coordinates of each of four corners of the box. The threshold condition may represent a trigger event in a scene camera view, for example, to cause a switch to the detail camera for a single capture (or brief capture burst) based on the detected trigger event. The threshold condition (e.g., trigger event) may be raised when conditions and/or items are recognized in a view of an image, for example.

FIG. 8B is a flow diagram 800B that illustrates the use of an image sensor (e.g., a scene camera 802 and a detail camera 804) installed in a wearable computing device and configured to capture or receive streams of image data. Similar to FIG. 8A, the scene camera 802 may capture and output one or more low resolution images (e.g., image frames), process the images with low power image signal processor 810 and/or perform computations with low power compute 814 to generate the low resolution image 812 and determine the object and/or region of interest 816.

Once the object and/or region of interest 816 is identified and the threshold condition is determined to be met, the high resolution image may be retrieved from the buffer 806. For example, the high power image signal processor 808 may use the low resolution image 812 and the cropping coordinates of cropped ROI 816 to identify the same ROI 816 within the high resolution, narrower field of view image stored in buffer 806 and captured at the same time as the image 812.

For example, the cropping coordinates (e.g., arrow 818) and the retrieved high resolution image frames may be provided as input to the high power image signal processor 808. The high power image signal processor 808 may output a processed (e.g., debayered, color corrected, shading corrected, etc.) image 820 that is cropped to the object and/or region of interest determined from the low resolution image frames. This cropped, full resolution image 820 may be provided to additional onboard or offboard devices for further processing.

In some implementations, rather than a plurality of image frames, a single high resolution image may be processed through the high power image signal processor to save computational and/or device power. Further computational and/or device power may also be accrued by further downstream processing because such downstream processing may operate on the cropped image 820, rather than the entire high resolution image.

FIGS. 4A through 8B describe flow diagrams that utilize a single sensor to provide the functionality of a dual sensor (e.g., a scene camera and a detail camera). In some implementations, the output of the single sensor may be configured to function in a dual mode without a separate sensor because the sensor may output at least two streams at different resolutions and/or different fields of view. For example, a first stream may be configured to output a wide field of view for a low resolution stream of images to represent the scene camera. Similarly, a second stream may be configured to output a narrow field of view for a high resolution stream of images to represent the detail camera.

Figure 9:
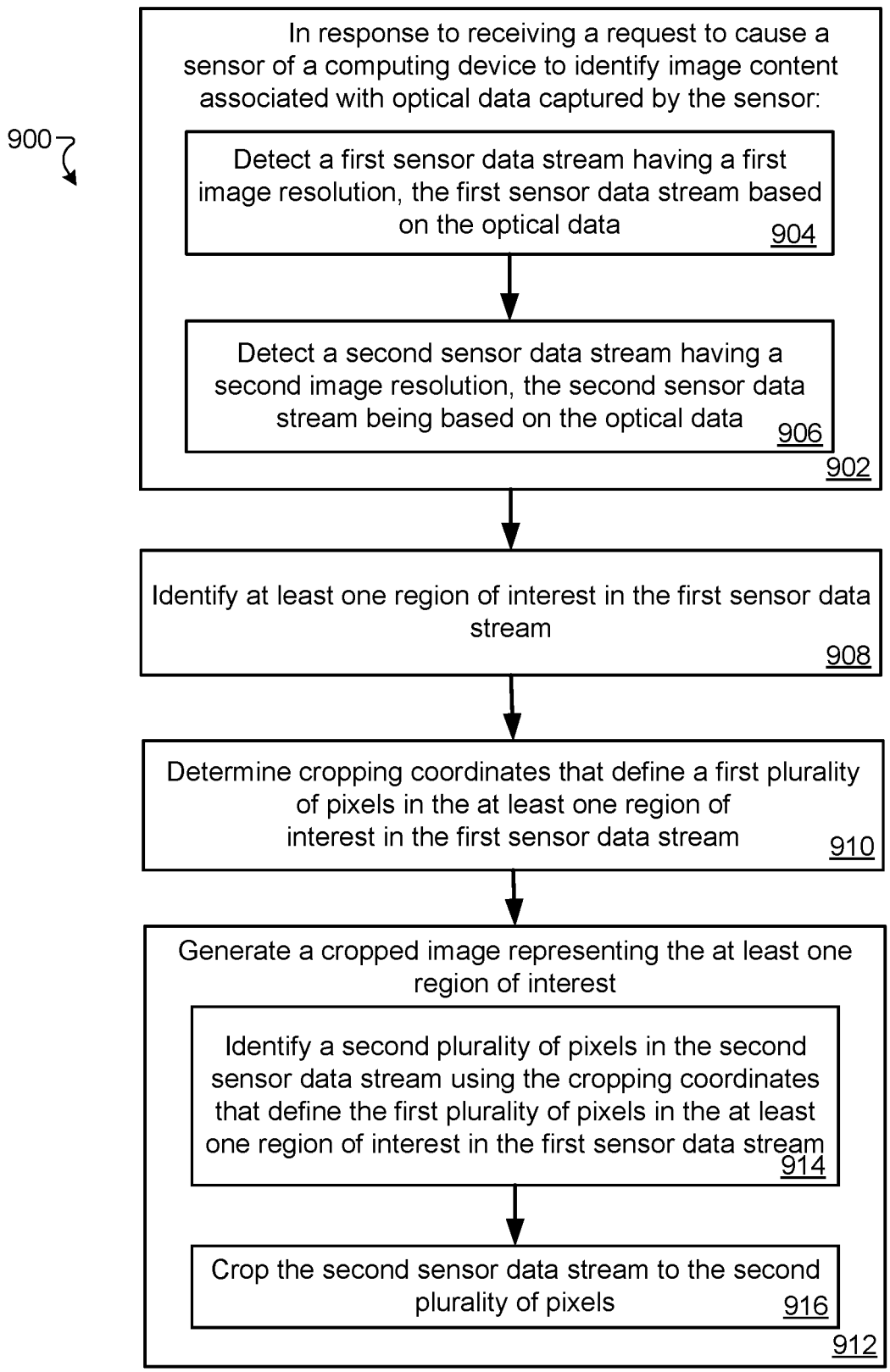
FIG. 9 is a flow chart diagramming one example of a process to perform image processing tasks on a wearable computing device, according to implementations described throughout this disclosure.

FIG. 9 is a flow chart diagramming one example of a process 900 to perform image processing tasks on a computing device, according to implementations described throughout this disclosure. In some implementations, the computing device is a wearable computing device that is battery-powered. In some implementations, the computing device is a non-wearable computing device that is battery powered.

The process 900 may utilize an image processing system on a computing device with at least one processing device, speaker, an optional display capabilities, and memory storing instructions that when executed cause the processing device to perform the plurality of operations and computer implemented steps described in the claims. In general, the wearable computing device 100, systems 200, and/or 1000 may be used in the description and execution of process 900. The combination of wearable computing device 100 and systems 200 and/or 1000 may, in some implementations, represent a single system. In general, process 900 utilizes the systems and algorithms described herein to detect image data to identify, in real time (e.g., at capture), one or more regions of interest, which may be cropped to reduce the amount of data used to perform the image processing on wearable computing device 100.

At block 902, the process 900 may include awaiting receipt of image content (or a request to identify image content). For example, the image sensor 216 on the wearable computing device 100 may receive, capture, or detect image content. In response to receiving the content or such a request to cause the sensor 216 to identify image content associated with optical data captured by the sensor, the sensor 216 and/or processors 208, 222, and/or 224 may detect, at block 904, a first sensor data stream having a first image resolution and the first sensor data stream may be based on the optical data. For example, the image sensor 216 may detect a low image resolution data stream based on optical data received at the image sensor 216 and may provide the low image resolution data stream to the low resolution image signal processor 222. In addition, at block 906, the sensor 216 and/or processors 208, 222, and/or 224 may detect a second sensor data stream having a second image resolution in which the second sensor data stream is also based on the optical data. For example, the image sensor 216 may detect a high image resolution data stream based on optical data received at the image sensor 216 and may provide the high image resolution data stream to the high resolution image signal processor 224.

In operation the first sensor data stream and the second data stream may be captured and/or received at the same time and/or with correlation to times of capture that may be cross-referenced to obtain a low resolution image from the first sensor data stream that matches a timestamp of a high resolution image from the second sensor data stream.

At block 908, the process 900 includes identifying, by processing circuitry of the wearable computing device 100, at least one region of interest in the first sensor data stream. For example, one or more ROIs 232 may be identified within image frames 226 obtained by the image sensor 216. The images frames 226 may have been analyzed by the low resolution image signal processor 222 and/or ROI detector 230. The ROI may be defined by pixels, edge detection coordinates, object shape or detection, or other region or object identification metric. In some implementations, the ROI may be an object or other image content in the image stream.

In some implementations, the processing circuitry may include a first image processor (e.g., low resolution processor 222) configured to perform image signal processing on the first sensor data stream (e.g., the low resolution stream) and a second image processor (e.g., high resolution image signal processor 224) configured to perform image signal processing on the second sensor data stream (e.g., the high resolution stream). In general, the first image resolution of the first sensor data stream is lower than the second image resolution of the second data sensor stream.

At block 910, the process 900 includes determining, by the processing circuitry, cropping coordinates 238 that define a first plurality of pixels in the at least one region of interest in the first sensor data stream. For example, the low resolution image signal processor 222 may utilize image frames 226, analyzed resolution 228, and ROI detector 230 to identify cropping coordinates to define an object 234 or region of interest (ROI) 232.

At block 912, the process 900 includes generating, by the processing circuitry, a cropped image representing the at least one region of interest. Generating the cropped image may include the cropper 236 triggering, at block 914, identification of a second plurality of pixels in the second sensor data stream using the cropping coordinates 238 that define the first plurality of pixels in the at least one region of interest in the first sensor data stream and cropping, at block 916, the second sensor data stream to the second plurality of pixels. The generated cropped image may be a high resolution version of the originally identified region or object of interest.

In some implementations, generating the cropped image representing the at least one region (or object) of interest is performed in response to detecting that the at least one region of interest meets a threshold condition 256. In general, the threshold condition 256 may represent a particular high level of quality for an object or region in an image frame of the stream of images. In some implementations, the threshold condition 256 may include detecting that the second plurality of pixels in the second sensor data stream have low blur. In some implementations, the threshold condition 256 may include detecting that the second plurality of pixels have a particular image exposure measurement. In some implementations, the threshold condition 256 may include detecting that the second plurality of pixels are in focus.

For example, a threshold condition may pertain to any or all of determining that the object or region is in focus, still with low blur, and/or has the correct exposure. The bounding box may represent cropping coordinates representing the region or object of interest 414. Once the object or region of interest (e.g., the second plurality of pixels) are determined and the threshold condition(s) have been met, the high power image signal processor may retrieve (or receive) the high resolution image frames (e.g., raw frames that match a same capture time as the low resolution image frames in which the object or region of interest was identified).

The cropped, high resolution image may be used for additional image analysis. For example, the processing circuitry 224 may include performing optical character resolution (OCR) on the cropped image to generate a machine-readable version (e.g., output 132) of the cropped image. The processing circuitry 224 may then perform a search query using the machine-readable version of the cropped image (e.g., image 418) to generate a plurality of search results (e.g., shown at output 132), which may be triggered for display on a display 244 of the wearable computing device 100. In some implementations, instead of a search query performance, the OCR may be performed on the cropped image to generate output 132, which may be displayed to the user on wearable computing device 100, read aloud to the user, and/or otherwise provided as output to be consumed by the user. For example, an audio output of the performed OCR may be provided from a speaker of the wearable computing device 100.

In some implementations, the second sensor data stream is stored in memory on the wearable computing device 100. For example, the high resolution image stream may be stored in a buffer 404 for later access to image frames and metadata associated with the high resolution image stream. In response to identifying at least one region (or object) of interest in the first sensor data stream, the processing circuitry 224 may retrieve a corresponding at least one region (or object) of interest in the second sensor data stored in memory. For example, the buffered data may be accessed to obtain a high resolution version of the image content identified in the region (or object) of interest in the low resolution image stream. In addition, the wearable computing device 100 may trigger the restriction of access to the first sensor data stream (e.g., the low resolution image stream) while continuing to detect and access the second sensor data stream (e.g., the high resolution image stream). That is, when the object or region of interest is determined, the wearable computing device 100 may no longer wish to use power or resources associated with the low resolution image stream and may restrict access to the stream to avoid overuse of resources and/or power with respect to streaming, storing, and/or accessing the low resolution image stream.

In some implementations, the process 900 may also include causing transmission of the generated cropped image to a mobile device in communication with the computing device in response to generating the cropped image representing the at least one region of interest. For example, upon identification and cropping of the high resolution image performed on the wearable computing device 100, the wearable computing device 100 may transmit the cropped image to the mobile device 202 for additional processing.

For example, the mobile device 202 may generate data or information about the region or object of interest. The mobile device 202 may have higher power and/or computational resources than the wearable computing device 100 and thus the generated data and/or information may be retrieved and/or calculated on the mobile device 202 and transmitted back to the wearable computing device 100. The wearable computing device 100 may receive, from the mobile device, information about the at least one region of interest and may cause display of the information on a display 244 of the wearable computing device 100.

In some implementations, the first image resolution has low image resolution and the second image resolution has high image resolution. Identifying the at least one region of interest or object of interest may further include the use of machine-learning algorithms (e.g., via NNs 254) executing on the wearable computing device 100. The machine-learning algorithms may use the first sensor data as input to identify text or at least one object represented in the first sensor data. For example, although the first data sensor stream may be of low resolution, a machine-learning algorithm may determine that text or objects are visible in the image stream.

For example, the wearable computing device 100 may employ a machine-learning algorithm to determine that particular image content (e.g., objects, ROIs) is present (e.g., depicted or represented) in the low resolution image. The cropper 236 may crop the determined unknown image content to the cropping coordinates 238 and may provide the cropped image to the trained machine-learning algorithm to determine whether the particular image content represents object(s) of interest and/or region(s) of interest. For example, a machine-learning algorithm to determine image content in which to crop may include identifying one or more details of a captured image. The identified details may be analyzed whether the details include a recognizable object, symbol, object portion, and the like.

For example, if the details are identified as a recognizable object, the wearable computing device 100 may then attempt to recognize particular features of the object. If the object is a soda can, for example, the wearable computing device 100 may assess which brand of soda. The machine-learning algorithm may execute, on device (e.g., on wearable computing device 100), light-weight detector architecture over a low resolution image to identify a ROI (or object of interest) coordinates of a particular pattern. For example, the machine-learning algorithm may determine, as output, that the brand of the soda can is a clustered region of text which can be identified by pattern and that pattern can be cropped out and used for further analysis. For example, the pattern may be cropped based on the machine-learning algorithm output indicating coordinates of the cropping. The coordinates can then be used to select a portion of the high resolution image of the same scene (e.g., the clustered region of text). That portion can be further analyzed to determine the brand. Because a portion of the high resolution is used based on input retrieved from a low resolution image, the machine-learning algorithm may provide the advantage of optimizing energy and latency on the wearable computing device 100 because analysis of a full high resolution image was avoided.

Examples described throughout this disclosure may refer to computer and/or computing systems. As used herein, a computer (and/or computing) system includes, without limitation, any suitable combination of one or more devices configured with hardware, firmware, and software to carry out one or more of the computerized techniques described herein. A computer (and/or computing) system as used herein may be a single computing device or multiple computing devices working collectively and in which the storage of data and the execution of functions are spread out amongst the various computing devices.

Examples described throughout this disclosure may refer to augmented reality (AR). As used herein, AR refers to a user experience in which a computer system facilitates a sensory perception that includes at least one virtual aspect and at least one aspect of reality. An AR experience can be provided by any of multiple types of computer system, including, but not limited to, a battery powered, wearable computing device or a battery powered, non-wearable computing device. In some implementations, a wearable computing device can include an AR headset which may include, but is not limited to, AR glasses, another wearable AR device, a tablet, a watch, or a laptop computer.

In some types of AR experiences, the user can perceive the aspect of reality directly with his or her senses without intermediation by the computer system. For example, some AR glasses, such as wearable computing device 100, are designed to beam an image (e.g., the virtual aspect to be perceived) to the user's retina while also allowing the eye to register other light that was not generated by the AR glasses. As another example, an in-lens micro display can be embedded in a see-through lens, or a projected display can be overlaid on a see-through lens. In other types of AR experiences, a computer system can improve, complement, alter, and/or enable the user's impression of reality (e.g., the real aspect to be perceived) in one or more ways. In some implementations, an AR experience is perceived on a screen of a computer system's display device. For example, some AR headsets and/or AR glasses are designed with camera feedthrough to present a camera image of the user's surrounding environment on a display device positioned in front of the user's eye.

Figure 10:
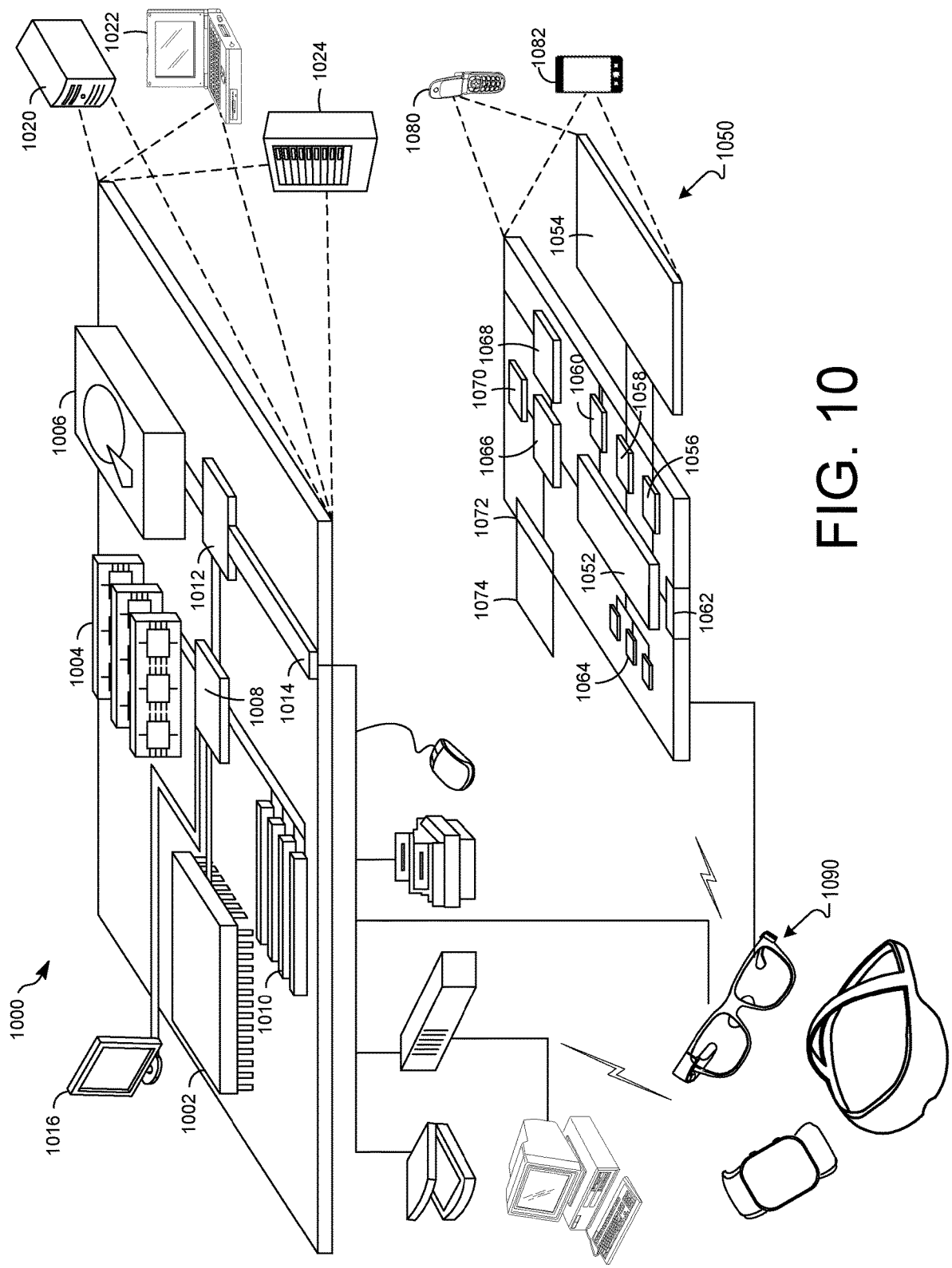
FIG. 10 illustrates an example of a computer device and a mobile computer device, which may be used with the techniques described herein.

FIG. 10 illustrates an example of a computer device 1000 and a mobile computer device 1050, which may be used with the techniques described here (e.g., to implement the wearable computing device 100 (e.g., client computing device), the server computing device 204, and/or mobile device 202). The computing device 1000 includes a processor 1002, memory 1004, a storage device 1006, a high-speed interface 1008 connecting to memory 1004 and high-speed expansion ports 1010, and a low-speed interface 1012 connecting to low-speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high-speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high-speed controller 1008 manages bandwidth-intensive operations for the computing device 1000, while the low-speed controller 1012 manages lower bandwidth-intensive operations. Such allocation of functions is example only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display), and LED (Light Emitting Diode) or an OLED (Organic Light Emitting Diode) display, or other appropriate display technology. The display interface 1056 may include appropriate circuitry for driving the display 1054 to present graphical and other information to a user. The control interface 1058 may receive commands from a user and convert them for submission to the processor 1052. In addition, an external interface 1062 may be provided in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In-Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provided as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in the figure can include sensors that interface with an AR headset/HMD device 1090 to generate an augmented environment for viewing inserted content within the physical space. For example, one or more sensors included on a computing device 1050 or other computing device depicted in the figure, can provide input to the AR headset 1090 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 1050 can use the sensors to determine an absolute position and/or a detected rotation of the computing device in the AR space that can then be used as input to the AR space. For example, the computing device 1050 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space.

In some implementations, one or more input devices included on, or connect to, the computing device 1050 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1050 when the computing device is incorporated into the AR space can cause a particular action to occur in the AR space.

In some implementations, a touchscreen of the computing device 1050 can be rendered as a touchpad in AR space. A user can interact with the touchscreen of the computing device 1050. The interactions are rendered, in AR headset 1090 for example, as movements on the rendered touchpad in the AR space. The rendered movements can control virtual objects in the AR space.

In some implementations, one or more output devices included on the computing device 1050 can provide output and/or feedback to a user of the AR headset 1090 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1050 may appear as another object in a computer-generated, 3D environment. Interactions by the user with the computing device 1050 (e.g., rotating, shaking, touching a touchscreen, swiping a finger across a touch screen) can be interpreted as interactions with the object in the AR space. In the example of the laser pointer in an AR space, the computing device 1050 appears as a virtual laser pointer in the computer-generated, 3D environment. As the user manipulates the computing device 1050, the user in the AR space sees movement of the laser pointer. The user receives feedback from interactions with the computing device 1050 in the AR environment on the computing device 1050 or on the AR headset 1090. The user's interactions with the computing device may be translated to interactions with a user interface generated in the AR environment for a controllable device.

In some implementations, a computing device 1050 may include a touchscreen. For example, a user can interact with the touchscreen to interact with a user interface for a controllable device. For example, the touchscreen may include user interface elements such as sliders that can control properties of the controllable device.

Computing device 1000 is intended to represent various forms of digital computers and devices, including, but not limited to laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. The components shown here, their connections and relationships, and their functions, are meant to be examples only, and are not meant to limit implementations of the subject matter described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. An image processing method comprising:
   receiving, by a computing device from an image sensor functioning in a dual-resolution streaming mode, both:
   a first image stream including a first plurality of images having a first image resolution, and
   a second image stream including a second plurality of images captured at a same capture time as the first plurality of images and having a second image resolution different from the first image resolution;
   identifying a region of interest by identifying, using the first image stream as input, text represented in the first image stream;
   determining a location for the region of interest in the first image stream; and
   generating, based on the location for the region of interest in the first image stream, a cropped image representing the region of interest in the second image stream.

2. The image processing method of claim 1, further comprising:
   performing optical character resolution on the cropped image to generate a machine-readable version of the cropped image;
   performing a search query using the machine-readable version of the cropped image to generate a plurality of search results; and
   displaying the plurality of search results on a display of the computing device.

3. The image processing method of claim 1, wherein the second image stream is stored in memory on the computing device, and
   the image processing method further comprises:
   in response to identifying the text represented in the first image stream, retrieving a corresponding region of interest in the second image stream stored in memory; and
   restricting access to the first image stream while continuing to detect and access the second image stream.

4. The image processing method of claim 1, further comprising:
   transmitting the cropped image to a mobile device in communication with the computing device;
   receiving, from the mobile device, information about the region of interest; and
   displaying the information on a display of the computing device.

5. The image processing method of claim 1, wherein:
   the first image resolution is lower than the second image resolution; and
   the identifying the region of interest is performed using a machine-learning algorithm executing on the computing device.

6. The image processing method of claim 1, wherein the computing device includes at least:
   a first image processor configured to perform image signal processing on the first image stream; and
   a second image processor configured to perform image signal processing on the second image stream, the first image resolution of the first image stream being lower than the second image resolution of the second image stream.

7. The image processing method of claim 1, wherein the generating the cropped image representing the region of interest is performed in response to detecting that the region of interest meets a threshold condition, the threshold condition including detecting that the second image stream has low blur.

8. A computing device comprising:
   a processing device;
   an image sensor configured, when functioning in a dual-resolution streaming mode, to send, to the processing device, both:
   a first image stream including a first plurality of images having a first image resolution, and
   a second image stream including a second plurality of images captured at a same capture time as the first plurality of images and having a second image resolution different from the first image resolution; and
   a memory storing instructions that when executed cause the processing device to perform operations including:
   identifying a region of interest in the first image stream;
   determining location for the region of interest in the first image stream; and
   generating, based on the location for the region of interest in the first image stream, a cropped image representing the region of interest in the second image stream.

9. The computing device of claim 8, wherein the image sensor is a dual stream image sensor further configured to operate in a low image resolution mode and in a high image resolution mode.

10. The computing device of claim 8, wherein the operations further comprise:
    performing optical character resolution on the cropped image to generate a machine-readable version of the cropped image;
    performing a search query using the machine-readable version of the cropped image to generate a plurality of search results; and
    outputting audio of the optical character resolution from a speaker of the computing device.

11. The computing device of claim 8, wherein the second image stream is stored in memory on the computing device, and wherein the operations further comprise:
    in response to identifying the region of interest in the first image stream, retrieving a corresponding region of interest in the second image stream stored in memory; and
    restricting access to the first image stream while continuing to detect and access the second image stream.

12. The computing device of claim 8, wherein the operations further comprise:
    transmitting the cropped image to a mobile device in communication with the computing device;
    receiving, from the mobile device, information about the region of interest; and
    outputting the information at the computing device.

13. The computing device of claim 8, wherein:
    the first image resolution is lower than the second image resolution; and
    the identifying the region of interest further includes identifying, by a machine-learning algorithm executing on the computing device and using the first image stream as input, text represented in the first image stream.

14. The computing device of claim 8, wherein the processing device includes:
    a first image processor configured to perform image signal processing on the first image stream; and
    a second image processor configured to perform image signal processing on the second image stream, the first image resolution of the first image stream being lower than the second image resolution of the second image stream.

15. A non-transitory computer-readable medium having instructions stored thereon, the instructions, when executed by processing circuitry, cause a computing device to:
receive a first image stream including a first plurality of images having a first image resolution;
receive a second image stream including a second plurality of images captured at a same capture time as the first plurality of images and having a second image resolution different from the first image resolution;
identify a region of interest by identifying, using the first image stream as input, text represented in the first image stream;
determine location for the region of interest in the first image stream; and
generate, based on the location for the region of interest in the first image stream, a cropped image representing the region of interest in the second image stream.

16. The non-transitory computer-readable medium of claim 15, wherein the processing circuitry is further configured to cause the computing device to:
perform optical character resolution on the cropped image to generate a machine-readable version of the cropped image;
perform a search query using the machine-readable version of the cropped image to generate a plurality of search results; and
display the plurality of search results on a display of the computing device.

17. The non-transitory computer-readable medium of claim 15,
wherein the second image stream is stored in memory on the computing device, and wherein the processing circuitry is further configured to cause the computing device to:
in response to identifying the text represented in the first image stream, retrieving a corresponding region of interest in the second image stream stored in memory; and
restricting access to the first image stream while continuing to detect and access the second image stream.

18. The non-transitory computer-readable medium of claim 15, wherein the processing circuitry is further configured to cause the computing device to:
transmit the cropped image to a mobile device in communication with the computing device;
receiving, from the mobile device, information about the region of interest; and
display the information on a display of the computing device.

19. The non-transitory computer-readable medium of claim 15, wherein:
the first image resolution is lower than the second image resolution; and
the identifying the region of interest is performed using a machine-learning algorithm executing on the computing device.

20. The non-transitory computer-readable medium of claim 15,
wherein the processing circuitry includes at least:
a first image processor configured to perform image signal processing on the first image stream; and
a second image processor configured to perform image signal processing on the second image stream, the first image resolution of the first image stream being lower than the second image resolution of the second image stream.

* * * * *

UNITED STATES PATENT AND TRADEMARK OFFICE
CERTIFICATE OF CORRECTION

PATENT NO. : 12,342,070 B2
APPLICATION NO. : 17/819170
DATED : June 24, 2025
INVENTOR(S) : Ganguly et al.

Page 1 of 1

It is certified that error appears in the above-identified patent and that said Letters Patent is hereby corrected as shown below:

On the Title Page

On Page 2, Column 2, Item (56), under "FOREIGN PATENT DOCUMENTS", Line 4, delete "201008110" and insert -- 2010081100 --, therefor.

In the Claims

In Column 35, Claim 17, Lines 32-35, delete "wherein the second image stream is stored in memory on the computing device, and wherein the processing circuitry is further configured to cause the computing device to:" and insert the same on Line 31, after "claim 15,", as a continuation paragraph.

In Column 36, Claim 20, Line 26, delete "wherein the processing circuitry includes at least:" and insert the same on Line 25, after "claim 15,", as a continuation paragraph.

Signed and Sealed this
Twenty-third Day of September, 2025

John A. Squires
*Director of the United States Patent and Trademark Office*